(12) United States Patent
Farag

(10) Patent No.: US 11,917,616 B2
(45) Date of Patent: Feb. 27, 2024

(54) METHOD AND APPARATUS FOR CONFIGURATION AND SIGNALING OF SL RESOURCES FOR INTER-UE CO-ORDINATION

(71) Applicant: Samsung Electronics Co., Ltd., Suwon-si (KR)

(72) Inventor: Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 17/305,721

(22) Filed: Jul. 13, 2021

(65) Prior Publication Data

US 2022/0030575 A1    Jan. 27, 2022

Related U.S. Application Data

(60) Provisional application No. 63/191,183, filed on May 20, 2021, provisional application No. 63/056,329, filed on Jul. 24, 2020.

(51) Int. Cl.
| | |
|---|---|
| H04W 72/04 | (2023.01) |
| H04W 72/02 | (2009.01) |
| H04W 72/12 | (2023.01) |
| H04L 5/00 | (2006.01) |
| H04W 72/20 | (2023.01) |
| H04W 72/56 | (2023.01) |

(52) U.S. Cl.
CPC ......... H04W 72/20 (2023.01); H04L 5/0048 (2013.01); H04W 72/56 (2023.01)

(58) Field of Classification Search
None
See application file for complete search history.

(56) References Cited

U.S. PATENT DOCUMENTS

| | | | |
|---|---|---|---|
| 11,528,148 B1 * | 12/2022 | Maharshak | ........... H04L 9/3247 |
| 2016/0183241 A1 * | 6/2016 | Lee | ................... H04W 56/0015 |
| | | | 455/425 |

(Continued)

FOREIGN PATENT DOCUMENTS

| | | |
|---|---|---|
| CN | 111435871 A | 7/2020 |
| WO | 2019174742 A1 | 9/2019 |
| WO | 2020030688 A1 | 2/2020 |

OTHER PUBLICATIONS

International Search Report and Written Opinion of the International Searching Authority in connection with International Application No. PCT/KR2021/009574 dated Oct. 26, 2021, 7 pages.

(Continued)

Primary Examiner — Sai Aung

(57) ABSTRACT

A method of operating a user equipment (UE) is provided. The method includes receiving a configuration message to enable inter-UE co-ordination for a sidelink (SL) resource pool, determining a target UE for a SL transmission, and transmitting, to the target UE, a signal to activate or trigger transmission of inter-UE co-ordination information. The method further includes receiving the inter-UE co-ordination information, determining a set of candidate SL resources based on the inter-UE co-ordination information, selecting a SL resource within the determined set, and transmitting a SL channel on the SL resource.

15 Claims, 19 Drawing Sheets

(56) References Cited

U.S. PATENT DOCUMENTS

| | | | |
|---|---|---|---|
| 2017/0366301 A1* | 12/2017 | Sun | H04L 1/0033 |
| 2018/0319235 A1* | 11/2018 | Wittenschlaeger | B60G 17/06 |
| 2019/0014564 A1* | 1/2019 | Lee | H04W 72/121 |
| 2020/0052856 A1* | 2/2020 | Jeon | H04L 5/0091 |
| 2020/0220694 A1* | 7/2020 | Khoryaev | H04L 1/1816 |
| 2020/0229171 A1 | 7/2020 | Khoryaev et al. | |
| 2020/0296762 A1 | 9/2020 | Sun et al. | |
| 2021/0195558 A1* | 6/2021 | Tang | H04W 4/40 |
| 2021/0243762 A1 | 8/2021 | Selvanesan et al. | |
| 2021/0410129 A1* | 12/2021 | Freda | H04W 72/087 |
| 2022/0007388 A1* | 1/2022 | Lee | H04W 80/02 |

OTHER PUBLICATIONS

LG Electronics, "WID revision: NR sidelink enhancement", RP-201385 (revision of RP-201283), 3GPP TSG RAN Meeting #88e, Electronic Meeting, Jun. 29-Jul. 3, 2020, 7 pages.

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.6.0, Jun. 2021, 577 pages.

Extended European Search Report dated Dec. 11, 2023 regarding Application No. 21845496.5, 7 pages.

Huawei et al., "On Sidelink enhancement", 3GPP TSG RAN WGI Meeting #101-e, R1-2004602, May 2020, 3 pages.

Vivo, "QoS management for sidelink", 3GPP TSG RAN WG1 Meeting #98, R1-1908155, Aug. 2019, 6 pages.

TCL Communication, "Views on Sidelink_Enhancement Priorities for R17", 3GPPTSG RAN#86, RP-192834, Dec. 2019, 5 pages.

* cited by examiner

RSAI: Resource Selection Assistance Information

METHOD AND APPARATUS FOR CONFIGURATION AND SIGNALING OF SL RESOURCES FOR INTER-UE CO-ORDINATION

CROSS-REFERENCE TO RELATED APPLICATIONS AND CLAIM OF PRIORITY

The present application claims priority to U.S. as described in embodiments of the present disclosure Provisional Patent Application No. 63/056,329, filed on Jul. 24, 2020 and U.S. Provisional Patent Application No. 63/191,183, filed on May 20, 2021. The content of the above-identified patent document is incorporated herein by reference.

TECHNICAL FIELD

The present disclosure relates generally to wireless communication systems and, more specifically, the present disclosure relates to configuration and signaling of sidelink (SL) resources for inter-UE co-ordination.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to configuration and signaling of SL resources for inter-UE co-ordination.

In one embodiment, a UE is provided. The UE includes a transceiver configured to receive a configuration message to enable inter-UE co-ordination for a SL resource pool. The UE includes a processor operably connected to the transceiver. The processor is configured to determine a target UE for a SL transmission. The transceiver is further configured to transmit, to the target UE, a signal to activate or trigger transmission of inter-UE co-ordination information and receive the inter-UE co-ordination information. The processor is further configured to determine a set of candidate SL resources based on the inter-UE co-ordination information and select a SL resource within the determined set. The transceiver is further configured to transmit a SL channel on the SL resource.

In another embodiment, another UE is provided. The UE includes a transceiver configured to receive a configuration message to enable inter-UE co-ordination for a SL resource pool and a signal to activate or trigger transmission of inter-UE co-ordination information. The UE further includes a processor operably connected to the transceiver. The processor is configured to determine, based on the configuration message and the signal triggering or activating the transmission of inter-UE co-ordination, the inter-UE co-ordination information. The transceiver is further configured to transmit the inter-UE co-ordination information and receive a SL channel on a SL resource based on the inter-UE co-ordination information.

In yet another embodiment, a method of operating a UE is provided. The method includes receiving a configuration message to enable inter-UE co-ordination for a SL resource pool, determining a target UE for a SL transmission, and transmitting, to the target UE, a signal to activate or trigger transmission of inter-UE co-ordination information. The method further includes receiving the inter-UE co-ordination information, determining a set of candidate SL resources based on the inter-UE co-ordination information, selecting a SL resource within the determined set, and transmitting a SL channel on the SL resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.6.0, "Physical channels and modulation"; 3GPP TS 38.212 v16.6.0, "NR; Multiplexing and Channel coding"; 3GPP TS 38.213 v16.6.0, "NR; Physical Layer Procedures for Control"; 3GPP TS 38.214: v.16.6.0, "Physical layer procedures for data"; 3GPP TS 38.321 v16.5.0, "Medium Access Control (MAC) protocol specification"; 3GPP TS 38.331 v.16.5.0. "Radio Resource Control (RRC) protocol specification"; and 3GPP TS 36.213 v16.6.0, "Evolved Universal Terrestrial Radio Access (E-UTRA); Physical layer procedures."

Figure 1:
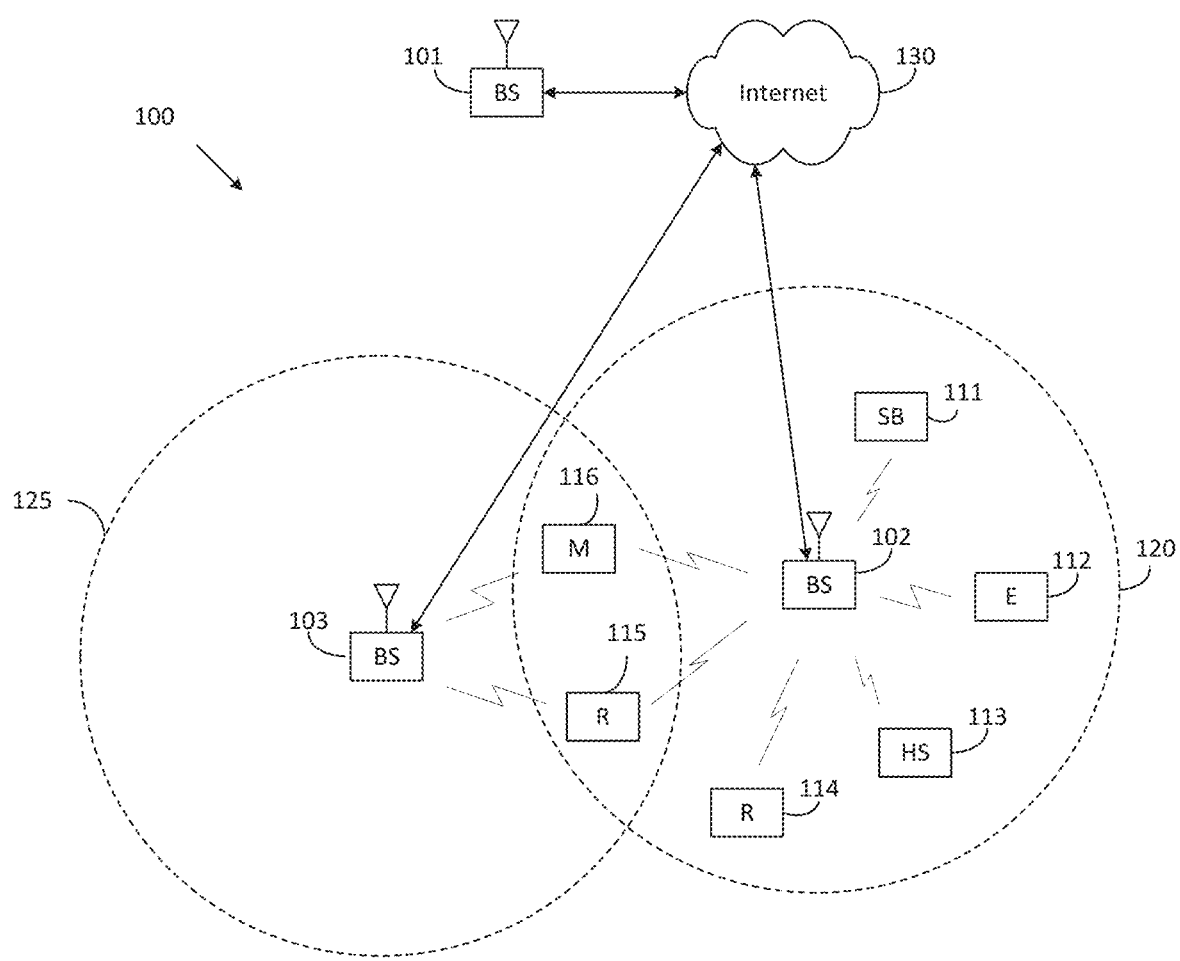
FIG. 1 illustrates an example wireless network according to embodiments of the present disclosure.
Figure 2:
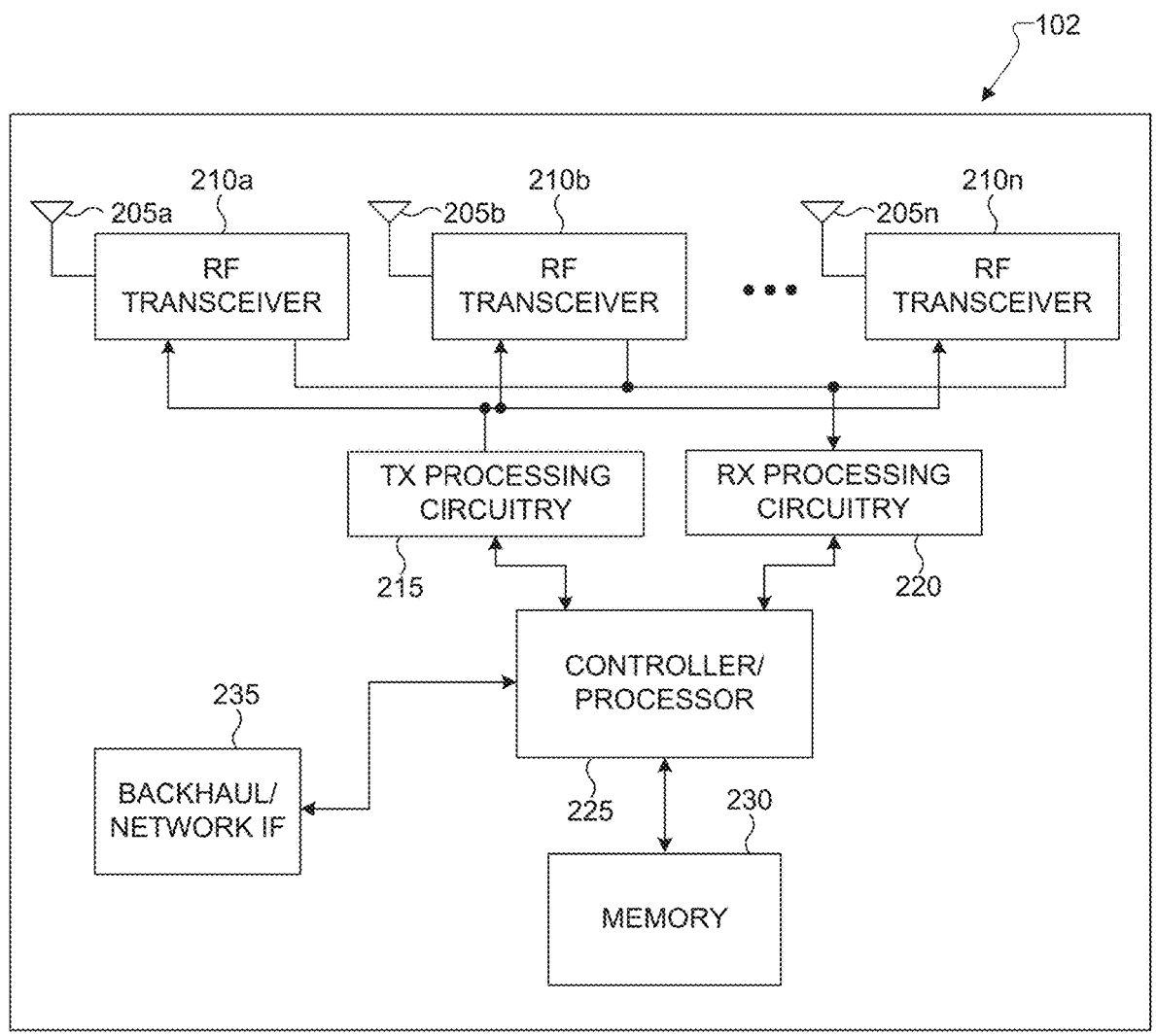
FIG. 2 illustrates an example gNB according to embodiments of the present disclosure.
Figure 3:
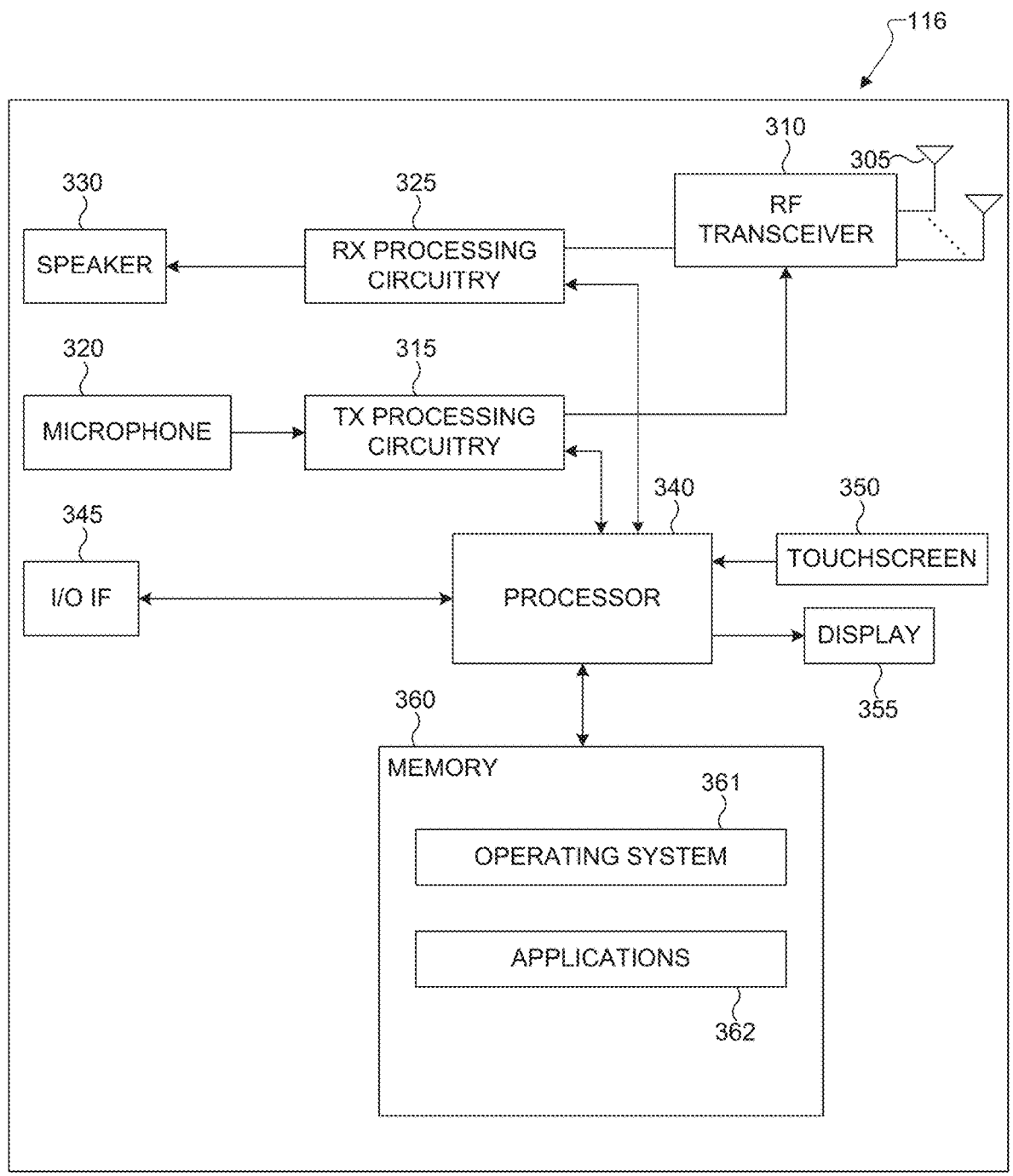
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for configuration and signaling of SL resources for inter-UE co-ordination. In certain embodiments, and one or more of the gNBs 101-103 includes circuitry, programing, or a combination thereof, for configuration and signaling of SL resources for inter-UE co-ordination.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the configuration and signaling of SL resources for inter-UE co-ordination. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for configuration and signaling of SL resources for inter-UE co-ordination. The processor 340 can move data into or out of the memory 360 as required by an executing process. In some embodiments, the processor 340 is configured to execute the applications 362 based on the OS 361 or in response to signals received from gNBs, other UEs, or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points. A communication system may also include a sidelink (SL) that refers to transmission from one or more UEs to one or more UEs A time unit for DL signaling or for UL signaling or SL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
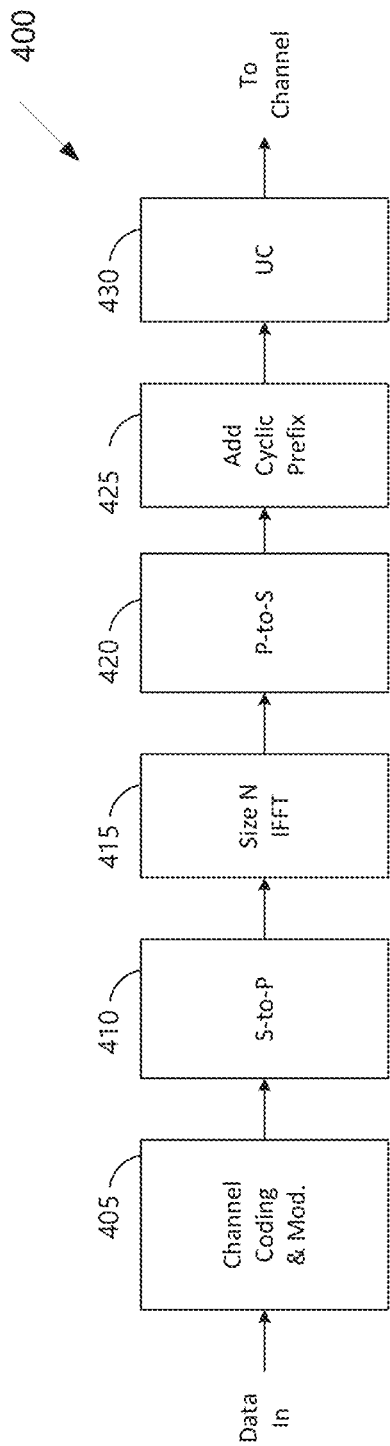
FIGS. 4 and 5 illustrate example wireless transmit and receive paths according to this disclosure.
Figure 5:
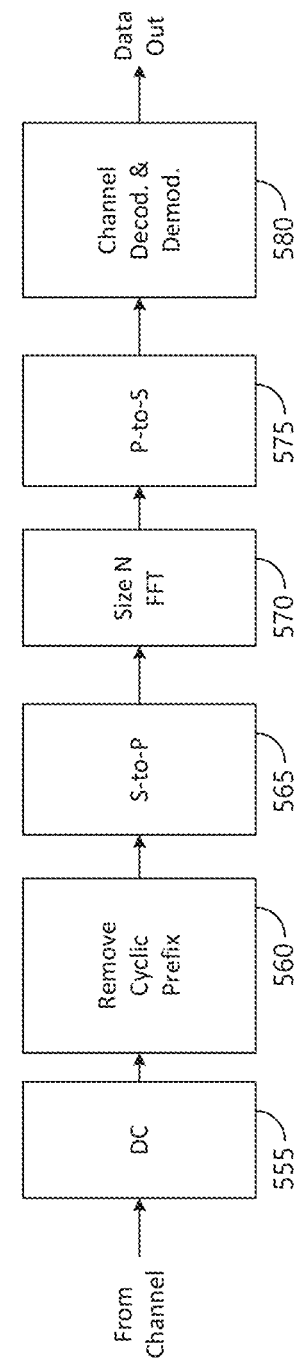

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support sidelink measurements in vehicle-to-everything (V2X) communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A slot can be used as a time unit for wireless communication. For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems. In addition, a slot can have symbols for SL communications. A UE can be configured one or more bandwidth parts (BWPs) of a system BW for transmissions or receptions of signals or channels.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information, physical SL control channels (PSCCHs) conveying SL control information (SCI) for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization.

SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a network can configure a UE one of two options for reporting of HARQ-ACK information by the UE.

In one example of a HARQ-ACK reporting option (1), a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB.

In another example of a HARQ-ACK reporting option (2), a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB (retransmission of the TB).

A SL resource pool includes a set/pool of slots and a set/pool of RBs used for sidelink transmission and sidelink reception. A set of slots which can belong to a sidelink resource pool can be denoted by $\{t_0^{SL}, t_1^{SL}, t_2^{SL}, \ldots\}$. A set of slots which belong to a resource pool can be denoted by $\{t'_0^{SL}, t'_1^{SL}, t'_2^{SL}, \ldots t'_{T'_{MAX}-1}^{SL}\}$ and can be configured, for example, at least using a bitmap. Where, $T'_{MAX}$ is the number of SL slots in a resource pool. Within each slot $t'_j^{SL}$ of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ PRBs, given by $n_{PRB}=n_{subCHstart}+m \cdot n_{subCHsize}+j$, where $j=0, 1, \ldots, n_{subCHsize}-1$, $n_{subCHstart}$ and $n_{subCHsize}$ are provided by higher layer parameters.

The slots of a SL resource pool are determined as follows: first, let a set of slots that may belong to a resource be denoted by $\{t_0^{SL}, t_1^{SL}, t_2^{SL}, \ldots, t_{T_{RMAX}-1}^{SL}\}$, where $0 \le t_i^{SL} < 10240$, and $0 \le i < T_{max}$. The slot index is relative to slot#0 of SFN#0 of the serving cell, or DFN#0. The set of slots includes all slots except:

- $N_{S-SSB}$ slots that are configured for SL SS/PBCH Block (S-SSB).
- $N_{nonSL}$ slots where at least one SL symbols is not not-semi-statically configured as UL symbol by higher layer parameter tdd-UL-DL-ConfigurationCommon or sl-TDD-Configurauion. In SL slots, OFDM symbols Y-th, (Y+1)-th, (Y+X−1)-th are SL symbols, where Y is determined by the higher layer parameter sl-StartSymbol and X is determined by higher layer parameter sl-LengthSymbols.

$N_{reserved}$ reserved slots. Reserved slots are determined such that the slots in the set $\{t_0^{SL}, t_1^{SL}, t_2^{SL}, \ldots, t_{T_{MAX}-1}^{SL}\}$ is a multiple of the bitmap length ($L_{bitmap}$), where the bitmap ($b_0, b_1, \ldots, k_{L_{bitmap}-1}$) is configured by higher layers. The reserved bits are determined as follows:

Let $\{l_0, l_1, l_{2^\mu \times 10240 - N_{S-SSB} - N_{nonSL}-1}\}$ be the set of slots in range $0 \ldots 2^\mu \times 10240 - 1$, excluding S-SSB slots and non-SL slots. The slots are arranged in ascending order of the slot index.

The number of reserved slots is given by: $N_{reserved} = (2^\mu \times 10240 - N_{S-SSB} - N_{nonSL}) \bmod L_{bitmap}$.

The reserved slots $l_r$ are given by:

$$r = \left\lfloor \frac{m \cdot (2^\mu \times 10240 - N_{S-SSB} - N_{nonSL})}{N_{reserved}} \right\rfloor,$$

where, $m = 0, 1, \ldots, N_{reserved}$ $T_{max}$ is given by: $T_{max} = 2^\mu \times 10240 - N_{S-SSB} - N_{nonSL} - N_{reserved}$.

Next, the slots are arranged in ascending order of slot index. Third, the set of slots belonging to the SL resource pool, $\{t'_0{}^{SL}, t'_1{}^{SL}, t'_2{}^{SL}, \ldots, t'_{T'_{MAX}-1}{}^{SL}\}$, are determined as follows:

Each resource pool has a corresponding bitmap ($b_0, b_1, b_{L_{bitmap}-1}$) of length $L_{bitmap}$.

A slot $t_k^{SL}$ belongs to the bitmap if $b_{k \bmod L_{bitmap}} = 1$

The remaining slots are indexed successively staring from $0, 1, \ldots T'_{MAX}-1$. Where, $T'_{MAX}$ is the number of remaining slots in the set.

Slots can be numbered (indexed) as physical slots or logical slots; physical slots include all slots numbered sequential, while logical slots include only slots that belong to a sidelink resource pool as described above numbered sequentially. The conversion from a physical duration, $P_{rsvp}$, in milli-second to a logical slots, $P'_{rsvp}$, is given by $$P'_{rsvp} = \left\lceil \frac{T'_{max}}{10240 \text{ ms}} \times P_{rsvp} \right\rceil.$$

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels $x+i$, where $i=0, 1, \ldots, L_{subCH}-1$ in slot $t'_y{}^{SL}$. $T_1$ is determined by the UE such that, $0 \leq T_1 \leq T_{proc,1}^{SL}$, where $T_{proc,1}^{SL}$ is a PSSCH processing time for example as defined 3GPP standard specification. $T_2$ is determined by the UE such that $T_{2\ min} \leq T_2 \leq$ Remaining Packet Delay Budget, as long as $T_{2\ min} <$ Remaining Packet Delay Budget, else $T_2$ is equal to the Remaining Packet Delay Budget. $T_{2\ min}$ is a configured by higher layers and depends on the priority of the SL transmission.

The resource (re-)selection is a two-step procedure. In one example, the first step is to identify the candidate resources within a resource selection window. Candidate resources are resources that belong to a resource pool, but exclude resources that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. The resources excluded are based on reserved transmissions or semi-persistent transmissions that can collide with the excluded resources or any of reserved or semi-persistent transmissions.

In another example, the second step is to select or re-select a resource from the identified candidate resources.

During the first step of the resource (re-)selection procedure, a UE can monitor slots in a sensing window $[n-T_0, n-T_{proc,0})$, where the UE monitors slots belonging to a corresponding sidelink resource pool that are not used for the UE's own transmission.

To determine a candidate single-slot resource set to report to higher layers, a UE excludes from the set of available single-slot resources for SL transmission within a resource pool and within a resource selection window.

In one example, single slot resource $R_{x,y}$ is considered (e.g., considered as excluded from the available resources), such that for any slot $t_m^{SL}$ not monitored within the sensing window with a hypothetical received SCI Format 1-0, with a "Resource reservation period" set to any periodicity value allowed by a higher layer parameter reseverationPeriodAllowed and indicating all sub-channels of the resource pool in this slot, satisfies condition 2.2. below.

In another example, single slot resource $R_{x,y}$ is considered (e.g., considered as excluded from the available resources), such that for any received SCI within the sensing window. In such example, the associated L1-RSRP measurement is above a (pre-)configured SL-RSRP threshold, where the SL-RSRP threshold depends on the priority indicated in the received SCI and that of the SL transmission for which resources are being selected.

In such example, in a condition 2.2, The received SCI in slot $t'_m{}^{SL}$, or if "Resource reservation field" is present in the received SCI the same SCI is assumed to be received in slot $t'_{m+q \times P'_{rsvp\_Rx}}$, indicates a set of resource blocks that overlaps $R_{x,y+j \times P'_{rsvp\_Tx}}$, where $q=1, 2, \ldots, Q$, where, if $$P_{rsvp\_RX} \leq T_{scal} \text{ and } n'-m < P'_{rsvp\_Rx} \Rightarrow Q = \left\lceil \frac{T_{scal}}{P'_{rsvp\_RX}} \right\rceil.$$

$T_{scal}$ is $T_2$ in units of milli-seconds, else $Q=1$. If n belongs to $(t'_0{}^{SL}, \ldots, t'_{T'max-})$, $n'=n$, else n' is the first slot after slot n belonging to set $(t'_0{}^{SL}, t'_1{}^{SL}, \ldots, t'_{T'_{max-1}}{}^{SL})$, where $j=0, 1, \ldots, C_{reset}-1$; $P_{rsvp\_Rx}$ is the indicated resource reservation period in the received SCI in physical slots, and $P'_{rsvp\_Rx}$ is that value converted to logical slots; and $P'_{rsvp\_Tx}$ is the resource reservation period of the SL transmissions for which resources are being reserved in logical slots.

In one example, if the candidate resources are less than a (pre-)configured percentage, such as 20%, of the total available resources within the resource selection window, the (pre-) configured SL-RSRP thresholds are increased by a predetermined amount, such as 3 dB.

NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot $m-T_3$.

The re-evaluation check includes: (1) performing the first step of the SL resource selection procedure as defined in 3GPP standard specifications, which involves identifying a candidate (available) sidelink resource set in a resource selection window as previously described; (2) if the pre-selected resource is available in the candidate sidelink resource set, the resource is used/signaled for sidelink transmission; and (3) else, the pre-selected resource is not available in the candidate sidelink resource set, a new sidelink resource is re-selected from the candidate sidelink resource set.

A pre-emption check occurs when a UE checks the availability of pre-selected SL resources that have been previously signaled and reserved in an SCI Format, and if needed re-selects new SL resources. For a pre-selected and reserved resource to be signaled or used in slot m, the UE performs a pre-emption check at least in slot m−$T_3$.

The pre-emption check includes: (1) performing the first step of the SL resource selection procedure as defined in 3GPP standard specifications, which involves identifying candidate (available) sidelink resource set in a resource selection window as previously described; (2) if the pre-selected and reserved resource is available in the candidate sidelink resource set, the resource is used/signaled for sidelink transmission; and (3) else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for pre-emption be $P_{TX}$.

In such examples, (1) if the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority, (2) else, the resource is used/signaled for sidelink transmission.

As aforementioned above, the monitoring procedure for resource (re)selection during the sensing window requires reception and decoding of a SCI format during the sensing window and measuring the SL RSRP of the SCI reception. This reception and decoding process increases a processing complexity and power consumption of a UE for sidelink communication and requires the UE to have receive circuitry on the SL for sensing even if the UE only transmits and does not receive on the sidelink.

3GPP release 16 is the first NR release to include sidelink through work item "5G V2X with NR sidelink," the mechanisms introduced focused mainly on V2X, and can be used for public safety when the service requirement can be met. Release 17 extends sidelink supports. One of the motivations for the sidelink enhancement in Release 17 is power savings. Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

One of the objectives of the Release 17 sidelink enhancement is to specify resource allocation enhancements that reduce power consumption, taking the principle of the release 14 LTE sidelink random resource selection and partial sensing as baseline with potential enhancements. The resource allocation enhancement specifies resource allocation to reduce power consumption of the UEs. In the resource allocation enhancement, a baseline is to introduce the principle of Rel-14 LTE sidelink random resource selection and partial sensing to Rel-16 NR sidelink resource allocation mode 2. Rel-14 does not preclude introducing a new solution to reduce power consumption for the cases where the baseline cannot work properly.

Another objective of the Release 17 sidelink enhancement is to study the feasibility and benefits of enhancements to resource allocation mode 2, a set of resources can be determined at a UE-A and sent to a UE-B, and the UE-B takes into account this set for a transmission of the UE-B.

Benefit of the enhancement(s) in mode 2 for enhanced reliability and reduced latency in consideration of both packet reception ratio (PRR) and Packet Inter-Reception (PIR) are defined in 3GPP standard specification. For inter-UE coordination, a set of resources is determined at UE-A. This set is sent to a UE-B in mode 2, and the UE-B takes this into account in the resource selection for the UE-B's own transmission.

To alleviate the issues associated with sensing, various schemes have been provided, e.g., random resource selection and partial sensing have been considered in LTE for sidelink transmission. With a random resource selection, a UE randomly selects a resource for sidelink transmission within the total available resources of a resource pool within a resource selection window.

However, with random resource selection, there is no control on which resource is selected by a UE within the total available resources and this absence of control can lead to a higher resource collision rate and increased failures on the sidelink interface. A resource is defined by a set of time resources, such as symbols of a slot or slots, and a set of frequency resources such as a number of RB s of sub-channels.

A collision on a resource over the time-frequency domain occurs when two or more UEs transmit on the resource. In one embodiment, a method is suggested to alleviate collision by restricting the resources a user can select for transmission based on a characteristic such as a user identity, a user location or a data priority. Alternatively, partial sensing can reduce the computation complexity by reducing the number of sensed slots during a sensing window, however, there is a tradeoff between sensing accuracy and computation complexity. With more slots sensed during a sensing window, the sensing accuracy is improved, and hence less likelihood of collision on a selected single slot resource within a resource selection window, however, the computation complexity is higher and hence higher power consumption by the UE.

On the other hand, with less slots sensed during a sensing window, the computation complexity is reduced, and hence less power consumption at the expense of a deterioration of the sensing accuracy and hence a greater likelihood of collision on a selected single slot resource within a resource selection window.

In some scenarios, for example for vulnerable road users (VRU) and pedestrian UEs (PUE), a low-cost, low-complexity and low-power terminal is desirable. In one example, the terminal may be just transmitting a location of the terminal and/or motion information to surrounding UEs, within a communication range, to alert other UEs of the presence of the VRU. To avoid collision with other users, it would be desirable that the selected resource does not collide with other sidelink transmissions.

As aforementioned above, in release 16 NR, a user senses the sidelink during a sensing window to avoid sidelink resources used by other users when selecting sidelink resources for transmission. Sensing increases the UE's power consumption and hence would not be suitable for UEs with limited battery energy such as VRUs and PUEs. Other schemes with no sensing such as random selection and with partial sensing would lead to a loss in performance due to a higher collision rate on the selected resources for sidelink transmission. However, if a user with limited energy were to receive sensing information from other UEs that have no power restriction, for example such UEs can be a roadside unit (RSU) or a vehicular UE, that have a larger power supply, the low energy UE can exploit this information when making a decision to select a sidelink resource for a transmission of the low energy UE.

In other instances, the UE transmitting sidelink information (e.g., UE-B) is not aware of the sidelink environment at the UE receiving the sidelink information (UE-A), without receiving sidelink resource selection assistance information (i.e., inter-UE co-ordination information) from a UE-A.

For example, the hidden node problem is when a third UE or node is causing interference or is attempting to transmit to a UE-A at the same time that the UE-B is attempting to transmit to the UE-A. When the UE-A provides resource selection assistance information to the UE-B, the UE-A can assist the UE-B in making resource allocation decisions that avoid the hidden node problem when transmitting to the UE-A.

In another example, the exposed node problem is when a sidelink resource is being sensed as occupied at the UE-B, i.e., the UE transmitting the sidelink information, but is not being sensed as occupied at the UE-A, i.e., the UE receiving the sidelink information. If the UE-B were to only use sensing information, the UE-B would not transmit on the resource to the UE-A. However, if the UE-B gets resource selection assistance information from the UE-A, the UE-B can allocate the resource for sidelink transmission to the UE-A.

As described in U.S. application Ser. No. 17/224,983 filed on April, 2021 which is incorporated herein by reference, methods for assisted resource selection for sidelink transmissions are considered that mitigate and reduce a probability of resource collisions among UEs, a UE can receive information related to sidelink sensing from other UEs in the UE's vicinity, the information received assists the UE in selecting sidelink resources for a sidelink transmission and minimizes the probability of collision with other sidelink transmissions. Timing aspects for sending resource selection assistance information/sensing information from a UE are considered. The resources used for transmission of resource selection assistance information can be (pre-)configured, scheduled by a gNB/eNB or determined following the sidelink resource selection procedures. This information can be transmitted in a periodic, semi-persistent or aperiodic manner.

In this disclosure, the configuration of inter UE co-ordination for transmitting and receiving resource selection assistance information is considered. Furthermore, the content and the signaling of resource selection assistance information is considered.

3GPP Release 16 is the first NR release to include sidelink through work item "5G V2X with NR sidelink", the mechanisms introduced focused mainly on V2X, and can be used for public safety when the service requirement can be met.

One of the motivations for the sidelink enhancement in Release 17 is power savings. One of the objectives of the Release 17 sidelink enhancement is to specify resource allocation enhancements that reduce power consumption. Another objective is to enhance reliability and reduce latency with resource allocation mode 2. In NR release 16, a UE performs sensing to determine available candidate resources for sidelink transmission to minimize probability of collision with other sidelink UEs. Sensing is a power consuming operation as the sensing requires a UE to monitor and receive the first part/stage SCI in every sidelink slot, a UE does not transmit in, during the sensing window.

Other techniques have been provided to reduce power dissipation by having no-sensing, in which case the UE does SL resource selection based on random selection, or partial sensing by reducing the number of sensed slots during a sensing window. Both of these schemes suffer from loss of sidelink performance due to increase sidelink collision probability. To address this issue, assisted sidelink resource selection is provided, a high energy UE (e.g., vehicular UE or RSU) can provide resource selection assistance information (e.g., sensing information) to low energy UEs (e.g., VRU and PUE) in a vicinity of the low energy UEs to assist a low energy UE with SL resource selection without having the low energy UE perform SL sensing. In this disclosure, the configuration of inter UE co-ordination and the provision and reception of resource selection assistance information as well as the content of resource selection assistance information is considered.

The present disclosure considers methods related to configuration and content of resource selection assistance information between UEs in a sidelink network. In the following embodiments and examples, a first UE or UEs, e.g., UE-A, also referred to as the controlling UE (or UEs) provides a set of resources and possibly other resource selection assistance information, referred to collectively as RSAI, to a second UE or UEs, e.g., UE-B, also referred to as controlled UE (or UEs). The controlled UE (i.e., the second UE or UE-B) selects and reserves a resource or multiple resources from the set of resources provided in the RSAI from the controlling UE (i.e., the first UE or UE-A). This is illustrated in FIG. 6.

Figure 6:
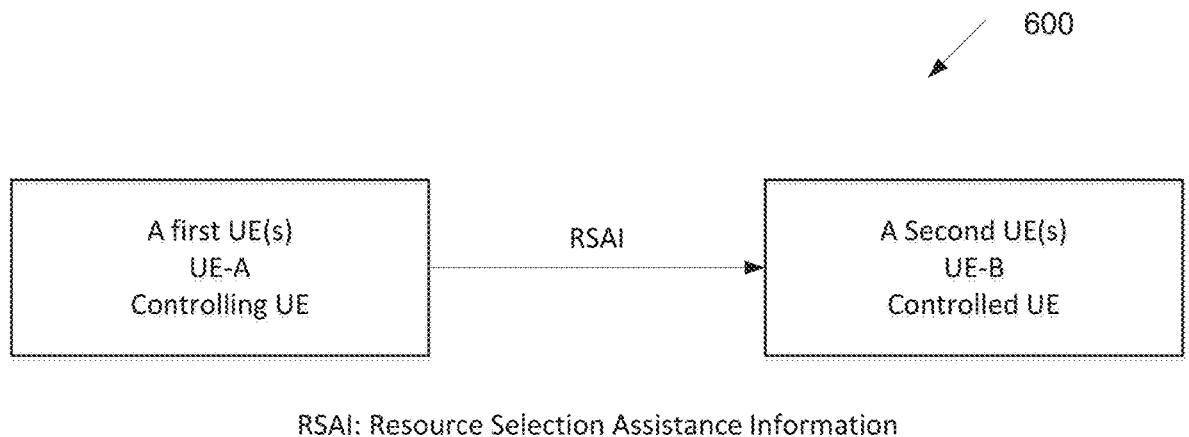
FIG. 6 illustrates an example resource selection assistance information between UEs according to embodiments of the present disclosure.

FIG. 6 illustrates an example resource selection assistance information among UEs 600 according to embodiments of the present disclosure. The resource selection assistance information among UEs 600 may be performed by UEs (e.g., 111-116 as illustrated in FIG. 1). An embodiment of the resource selection assistance information among UEs 600 shown in FIG. 6 is for illustration only.

The RSAI from a first UE, i.e., a controlling UE can be transmitted: (1) as a broadcast message to all UEs in the vicinity of the controlling UE; (2) as a groupcast message to a set of UEs in the vicinity of the controlling UE, within a (pre-)configured set for example, the set of UEs can be addressed by a common identifier; and/or (3) as a unicast message to a single UE.

The RSAI for a controlling UE can be received by controlled UEs as well as possibly other controlling UEs.

A resource pool can be (pre-)configured to support inter-UE co-ordination (RSAI). A UE maybe further (pre-)configured and/or has a UE capability to support providing RSAI (e.g., inter-UE coordination) messages, i.e., the UE can be a UE-A. A UE maybe further (pre-) configured and/or has a UE capability to support receiving RSAI (e.g., inter-UE coordination) messages, i.e., the UE can be a UE-B.

In one embodiment, a UE configuration and triggering for resource selection assistance information is provided. In this embodiment, configuration of inter UE co-ordination including the configuration of transmission and reception of resource selection assistance information is provided.

In one example 1.1, a UE can be pre-configured to provide information to adjacent UEs to assist adjacent UEs in performing resource selection, e.g., a UE provides resource selection assistance information (RSAI) to adjacent UEs. For example, RSAI can be inter-UE coordination information.

In one example 1.1.1, the transmission of RSAI can be triggered, activated or deactivated by RRC signaling and/or MAC CE signaling and/or L1 control signaling.

In another example 1.1.2, the transmission of RSAI is always activated, i.e., no activation signaling.

In another example 1.2, a UE can be configured by a gNB/NW through the Uu interface to provide information to adjacent UEs to assist adjacent UEs in performing resource selection, e.g., a UE provides RSAI to adjacent UEs. For example, RSAI can be inter-UE coordination information. The configuration can be by RRC signaling and/or MAC CE signaling and/or L1 control signaling. The configuration can trigger, activate or deactivate the transmission of information to adjacent UEs to assist adjacent UEs in performing resource selection, e.g., RSAI. The configuration can include parameters controlling the provision and transmission of RSAI and the information content of RSAI. In some cases, the configuration of the provision and transmission of RSAI can be separate from the activation or triggering of RSAI transmissions, in other cases the configuration of the provision and transmission of RSAI includes the triggering or activation of RSAI transmissions.

In one example 1.2.1, a UE provides the gNB/NW capability of the UE to send RSAI to adjacent UEs. The gNB takes the UE's capability of sending RSAI into account when configuring the UE to send RSAI. i.e., a UE not capable of sending RSAI may not be configured to transmit RSAI to adjacent UEs. A UE capable of transmitting RSAI can be configured to transmit RSAI to adjacent UEs. The provision of the capability to send RSAI to a gNB can be done directly through a Uu link between the gNB and the UE, or the provision of the capability can be done indirectly through another gNB, or through an eNB, or through another UE, or through multiple of these.

In another example 1.2.2, a UE does not provide capability of the UE to send RSAI to the gNB/NW. If a UE receives a request to send RSAI to adjacent UEs and the UE does not support sending RSAI, the UE can: (1) ignore the request to send RSAI to adjacent UEs, and/or (2) send an indication to the gNB/NW that the UE is not capable of sending RSAI to adjacent UEs.

In another example 1.3, a UE can be configured by an eNB/NW through the Uu interface to provide information to adjacent UEs to assist adjacent UEs in performing resource selection, e.g., a UE provides RSAI to adjacent UEs. For example, RSAI can be inter-UE coordination information. The configuration can be by RRC signaling and/or MAC CE signaling and/or L1 control signaling. The configuration can trigger, activate or deactivate the transmission of information to adjacent UEs to assist adjacent UEs in performing resource selection, e.g., RSAI. The configuration can include parameters controlling the provision and transmission of RSAI and the information content of RSAI. In some cases, the configuration of the provision and transmission of RSAI can be separate from the activation or triggering of RSAI transmissions, in other cases the configuration of the provision and transmission of RSAI includes the triggering or activation of RSAI transmissions. In various embodiments, there is a distinction between activation and triggering. For activation, the transmission of RSAI starts (e.g., periodically) until a message is sent to deactivate the transmission of RSAI. For triggering, the transmission of RSAI happens once or N times with no deactivation message.

In one example 1.3.1, a UE provides the eNB/NW capability of the UE to send RSAI to adjacent UEs. The eNB takes the UE's capability of sending RSAI into account when configuring the UE to send RSAI. i.e., a UE not capable of sending RSAI may not be configured to transmit RSAI to adjacent UEs. A UE capable of transmitting RSAI can be configured to transmit RSAI to adjacent UEs. The provision of the capability to send RSAI to an eNB can be done directly through a Uu link between the eNB and the UE, or the provision of the capability can be done indirectly through another eNB, or through a gNB, or through another UE, or through multiple of these.

In another example 1.3.2, a UE does not provide capability of the UE to send RSAI to the eNB/NW. If a UE receives a request to send RSAI to adjacent UEs and the UE does not support sending RSAI, the UE can: (1) ignore the request to send RSAI to adjacent UEs, and/or (2) send an indication to the eNB/NW that the UE is not capable of sending RSAI to adjacent UEs.

Figure 7:
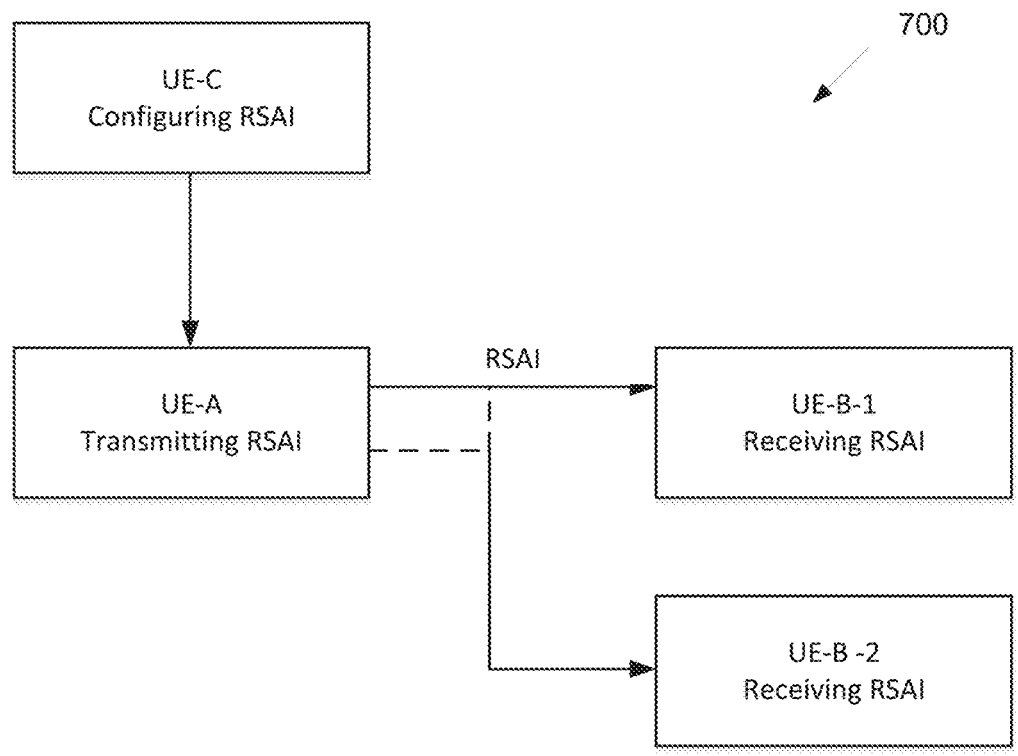
FIG. 7 illustrates an example resource selection assistance information between UEs according to embodiments of the present disclosure.

In another example 1.4, as illustrated in FIG. 7, a first UE, referred to as UE-A, can be configured by a second SL UE, referred to as a UE-C, through the SL (PC5) interface to provide information to adjacent third UE(s) (referred to collectively as UE-B(s)) to assist adjacent third UE(s) (i.e., UE-B(s)) in performing resource selection, e.g., a first UE (UE-A) provides resource selection assistance information (RSAI) to adjacent third UE(s) (i.e., UE-B(s)). For example, RSAI can be inter-UE coordination information. The configuration can be by RRC signaling and/or MAC CE signaling and/or L1 control signaling on the SL (PC5) interface.

The configuration can trigger, activate or deactivate the transmission of information to adjacent UE(s) (i.e., UE-B(s)) to assist adjacent UE(s) (i.e., UE-B(s)) in performing resource selection, e.g., RSAI. The configuration can include parameters controlling the provision and transmission of RSAI and the information content of RSAI. In some cases, the configuration of the provision and transmission of RSAI can be separate from the activation or triggering of RSAI transmissions, in other cases the configuration of the provision and transmission of RSAI includes the triggering or activation of RSAI transmissions. The second UE (i.e. UE-C) can be separate from third UE(s) (i.e. UE-B(s)). Alternative, the second UE (i.e. UE-C) can be part of the third UE(s) (i.e. UE-B(s)). UE-B(s) can be one or more UEs. In FIG. 7, and according to example 1.11, the RSAI can be broadcast and/or groupcast and/or unicast.

FIG. 7 illustrates an example resource selection assistance information among UEs 700 according to embodiments of the present disclosure. The resource selection assistance information among UEs 700 may be performed by UEs (e.g., 111-116 as illustrated in FIG. 1). An embodiment of the resource selection assistance information among UEs 700 shown in FIG. 7 is for illustration only.

In one example 1.4.1, A UE-A provides a UE-C capability of the UE-A to send RSAI to adjacent UEs (i.e., UE-Bs). The UE-C takes UE-A's capability of sending RSAI into account when configuring the UE-A to send RSAI. i.e., a UE not capable of sending RSAI may not be configured to transmit RSAI to adjacent UE(s) (i.e., UE-B(s)). A UE capable of transmitting RSAI can be configured to transmit RSAI to adjacent UE(s) (i.e., UE-B(s)). The provision of the capability to send RSAI to the UE-C can be done directly through a SL (PC5) interface between the UE-C and UE-A, or the provision of the capability can be done indirectly through another gNB, or through another eNB, or through another UE, or through multiple of these.

In another example 1.4.2, A UE-A does not provide capability of the UE-A to send RSAI to a UE-C. If the UE-A receives a request to send RSAI to adjacent UE(s) (i.e., UE-B(s)) and the UE-A does not support sending RSAI, the UE-A can: (1) ignore the request to send RSAI to adjacent UE(s) (i.e., UE-B(s)), and/or (2) send an indication to the UE-C that the UE-A is not capable of sending RSAI to adjacent UE(s) (i.e., UE-B(s)).

In examples 1.2, 1.3 and 1.4, the entity configuring the provision and transmission of RSAI, e.g., gNB or eNB or a UE can be separate from the entity, e.g., gNB or eNB or a UE, triggering, activating or deactivating the transmission of RSAI.

In examples 1.1, 1.2, 1.3 and 1.4, the configuration, triggering, activation and deactivation of the provision and transmission of RSAI can be UE-specific (e.g., unicast) signaling and/or UE group-specific (e.g., groupcast) signaling and/or cell-specific (e.g., broadcast) signaling.

In one example 1.5, a UE can be pre-configured to receive information from adjacent UEs to assist in performing resource selection on the sidelink, e.g., a UE is provided RSAI from adjacent UEs. For example, RSAI can be inter-UE coordination information.

In one example 1.5.1, the reception of RSAI can be activated or deactivated by RRC signaling and/or MAC CE signaling and/or L1 control signaling.

In another example 1.5.2, the reception of RSAI is always activated, i.e., no activation signaling.

In another example 1.6, a UE can be configured by a gNB/NW through the Uu interface to receive information from adjacent UEs to assist in performing resource selection on the sidelink, e.g., a UE is provided RSAI from adjacent UEs. For example, RSAI can be inter-UE coordination information. The configuration can be by RRC signaling and/or MAC CE signaling and/or L1 control signaling. The configuration can trigger, activate or deactivate the reception and usage of information from adjacent UEs to assist in performing resource selection, e.g., RSAI. The configuration can include parameters controlling the reception and usage of RSAI and the information content of RSAI. In some cases, the configuration of the reception and usage of RSAI can be separate from the activation or triggering of RSAI receptions, in other cases the configuration of the reception and usage of RSAI includes the triggering or activation of RSAI receptions.

In one example 1.6.1, a UE provides the gNB/NW capability of the UE to receive and use RSAI from adjacent UEs. The gNB takes the UE's capability of receiving and using RSAI into account when configuring the UE to receive and use RSAI. i.e., a UE not capable of receiving and using RSAI may not be configured to receive RSAI from adjacent UEs. A UE capable of receiving and using RSAI can be configured to receive and use RSAI from adjacent UEs. The provision of the capability to receive and use RSAI to a gNB can be done directly through a Uu link between the gNB and the UE, or the provision of the capability can be done indirectly through another gNB, or through an eNB, or through another UE, or through multiple of these.

In another example 1.6.2, a UE does not provide capability of the UE to receive and use RSAI to the gNB/NW. If a UE receives a request to receive and use RSAI from adjacent UEs and the UE does not support receiving and using RSAI, the UE can: (1) ignore the request to receive and use RSAI from adjacent UEs, and/or (2) send an indication to the gNB/NW that the UE is not capable of receiving and using RSAI from adjacent UEs.

In another example 1.7, a UE can be configured by an eNB/NW through the Uu interface to receive information from adjacent UEs to assist in performing resource selection on the sidelink, e.g., a UE is provided RSAI from adjacent UEs. For example, RSAI can be inter-UE coordination information. The configuration can be by RRC signaling and/or MAC CE signaling and/or L1 control signaling. The configuration can trigger, activate or deactivate the reception and usage of information from adjacent UEs to assist in performing resource selection, e.g., RSAI. The configuration can include parameters controlling the reception and usage of RSAI and the information content of RSAI. In some cases, the configuration of the reception and usage of RSAI can be separate from the activation or triggering of RSAI receptions, in other cases the configuration of the reception and usage of RSAI includes the triggering or activation of RSAI receptions.

In one example 1.7.1, a UE provides the eNB/NW capability of the UE to receive and use RSAI from adjacent UEs. The eNB takes the UE's capability of receiving and using RSAI into account when configuring the UE to receive and use RSAI. i.e., a UE not capable of receiving and using RSAI may not be configured to receive RSAI from adjacent UEs. A UE capable of receiving and using RSAI can be configured to receive and use RSAI from adjacent UEs. The provision of the capability to receive and use RSAI to an eNB can be done directly through a Uu link between the eNB and the UE, or the provision of the capability can be done indirectly through another eNB, or through a gNB, or through another UE, or through multiple of these.

In another example 1.7.2, a UE does not provide capability of the UE to receive and use RSAI to the eNB/NW. If a UE receives a request to receive and use RSAI from adjacent UEs and the UE does not support receiving and using RSAI, the UE can: (1) ignore the request to receive and use RSAI from adjacent UEs, and/or (2) send an indication to the eNB/NW that the UE is not capable of receiving and using RSAI from adjacent UEs.

Figure 8:
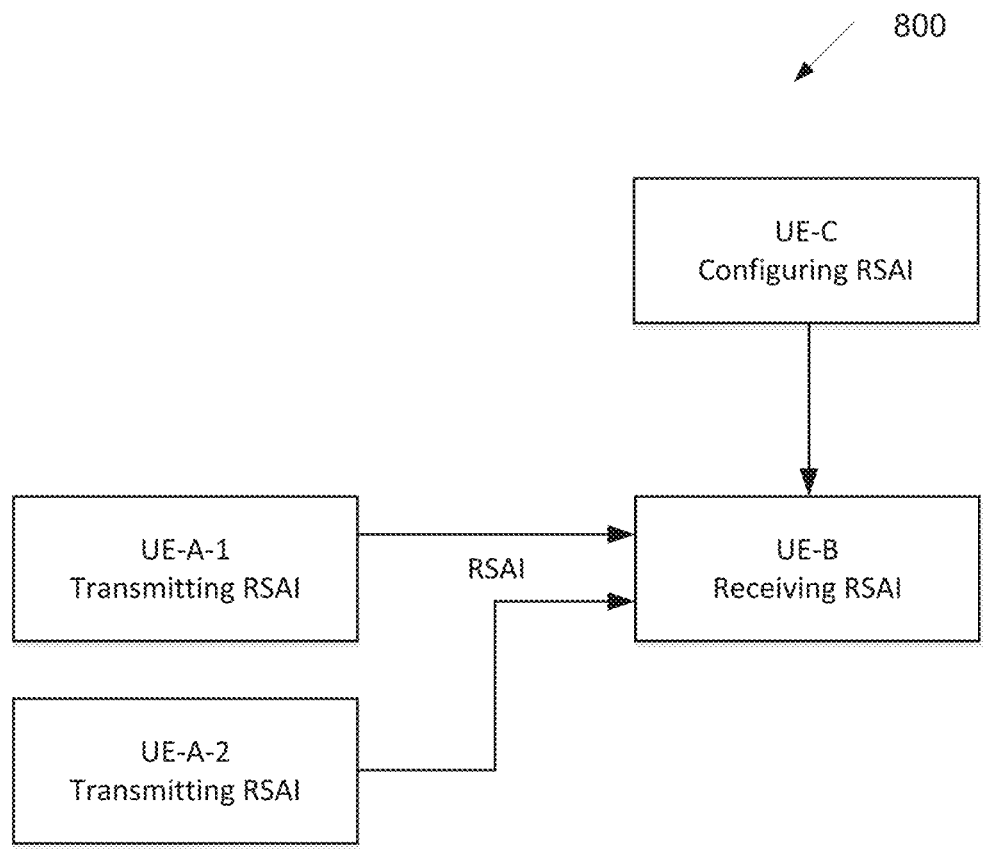
FIG. 8 illustrates an example resource selection assistance information among UEs according to embodiments of the present disclosure.

FIG. 8 illustrates an example resource selection assistance information among UEs 800 according to embodiments of the present disclosure. The resource selection assistance information among UEs 800 may be performed by UEs (e.g., 111-116 as illustrated in FIG. 1). An embodiment of the resource selection assistance information among UEs 800 shown in FIG. 8 is for illustration only.

In another example 1.8, as illustrated in FIG. 8, a first UE, referred to as a UE-B, can be configured by a second SL UE, referred to as a UE-C, through the SL (PC5) interface to receive information from adjacent third UE(s) (referred to collectively as UE-A(s)) to assist in performing resource selection, e.g., the first UE (UE-B) is provided resource selection assistance information (RSAI) from adjacent third UE(s) (i.e., UE-A(s)). For example, RSAI can be inter-UE coordination information. The configuration can be by RRC signaling and/or MAC CE signaling and/or L1 control signaling on the SL (PC5) interface. The configuration can trigger, activate or deactivate the reception and usage of information from adjacent UE(s) (i.e., UE-A(s)) to assist in performing resource selection, e.g., RSAI. The configuration can include parameters controlling the reception and usage of RSAI and the information content of RSAI. In some cases, the configuration of the reception and usage of RSAI can be separate from the activation or triggering of RSAI receptions, in other cases the configuration of the reception and usage of RSAI includes the triggering or activation of RSAI receptions. The second UE (i.e. UE-C) can be separate from the third UE(s) (i.e. UE-A(s)). Alternatively, the second UE (i.e. UE-C) can be part of the third UE(s) (i.e. UE-A(s)). The UE-A(s) can be one or more UEs.

In one example 1.8.1, a UE-B provides a UE-C capability of the UE-B to receive and use RSAI from adjacent UE(s) (i.e., UE-A(s)). The UE-C takes UE-B's capability of receiving and using RSAI into account when configuring the UE-B to receive and use RSAI. i.e., a UE not capable of receiving and using RSAI may not be configured to receive RSAI from adjacent UEs (i.e., UE-A(s)). A UE capable of receiving and using RSAI can be configured to receive and use RSAI from adjacent UEs (i.e., UE-A(s)). The provision of the capability to receive and use RSAI to the UE-C can be done directly through a SL (PC5) interface between the UE-C and the UE-B, or the provision of the capability can be done indirectly through another gNB, or through another eNB, or through another UE, or through multiple of these.

In another example 1.8.2, a UE-B does not provide capability of the UE-B to receive and use RSAI to the UE-C. If the UE-B receives a request to receive and use RSAI from adjacent UEs (i.e., UE-A(s)) and the UE-B does not support receiving and using RSAI, the UE-B can: (1) ignore the request to receive and use RSAI from adjacent UEs (i.e., UE-A(s)), and/or (2) send an indication to the UE-C that the UE-B is not capable of receiving and using RSAI from adjacent UEs (i.e., UE-A(s)).

In the examples 1.6, 1.7 and 1.8, the entity configuring the reception and usage of RSAI, e.g., gNB or eNB or a UE can be separate from the entity, e.g., gNB or eNB or a UE, triggering, activating or deactivating the reception of RSAI.

In the examples 1.5, 1.6, 1.7 and 1.8, the configuration, triggering, activation and deactivation of the reception and usage of RSAI can be UE-specific (e.g., unicast) signaling and/or UE group-specific (e.g., groupcast) signaling and/or cell-specific (e.g., broadcast) signaling.

In the examples 1.2, 1.3, 1.4, 1.6, 1.7 and 1.8, a single configuration message can be used to configure the provision and transmission of RSAI as well as the reception and usage of RSAI. Alternatively, separate configuration messages can be used to configure the provision and transmission of RSAI and to configure the reception and usage of RSAI.

In the examples 1.1 to 1.8, the triggering or activation message can include additional or updated configuration parameters.

In the examples 1.1 to 1.8, the deactivation message can include additional or updated configuration parameters.

In one example 1.9, a PSFCH-like channel, can be used to trigger, activate or deactivate the transmission and/or the reception of RSAI. For example, RSAI can be inter-UE coordination information. A PSFCH-like channel is a physical channel with same structure as that of PSFCH (as described in 38.211), i.e. the Physical channel includes 12 orthogonal sequences multiplexed into one PRB. Each one or two sequences is used to convey one bit of information. The PSFCH has a duration of one two symbols, the first symbol is a repetition of the second symbol.

In one example 1.9.1, the PSFCH-like channel for triggering or activation of transmission and/or reception is configured a resource including a slot, PRB and a cyclic shift. Transmission on the configured resource of the PSFCH-like channel indicates activation or triggering of the transmission or reception of RSAI. For example, the PSFCH-like channel can be transmitted from a UE-B (i.e., the UE receiving the RSAI) to a UE-A (i.e., the UE transmitting the RSAI) to trigger or activate the transmission of RSAI from the UE-A.

In another example 1.9.2, the PSFCH-like channel for activation or triggering of transmission and/or reception of RSAI is configured in multiple resources including slot(s), PRB(s) and cyclic shift(s), each resource corresponds to a RSAI configuration. Transmission on a configured resource of the PSFCH-like channel indicates activation of the transmission or reception of RSAI with a corresponding configuration. For example, multiple PSFCH-like channel resources can be configured for different UE-B transmission priority levels. A PSFCH-like channel transmitted from the UE-B on a resource corresponding to a transmission priority triggers or activates the transmission of RSAI for that transmission priority from a UE-A.

In another example 1.9.3, the PSFCH-like channel for deactivation of transmission and/or reception is configured a resource including a slot, PRB and a cyclic shift. Transmission on the configured resource of the PSFCH-like channel indicates deactivation of the transmission or reception of RSAI. For example, the PSFCH-like channel can be transmitted from a UE-B (i.e., the UE receiving the RSAI) to a UE-A (i.e., the UE transmitting the RSAI) to deactivate the transmission of RSAI from the UE-A.

In one example 1.10, a SCI in a PSCCH channel, with or without a corresponding PSSCH, can be used to trigger, activate or deactivate the transmission and/or the reception of RSAI. The SCI can include additional information for configuration of RSAI transmissions or receptions. For example, RSAI can be inter-UE coordination information. For example, there can be multiple RSAI configurations and the SCI includes information on the one or more RSAI configurations being triggered and/or activated and/or deactivated.

Example 1.11 considers the RSAI transmission cast-type (i.e., broadcast, groupcast and unicast). In the previous examples (example 1.1 to 1.8) the RSAI from a UE transmitting RSAI, also referred to as a controlling UE or UE-A, to one or multiple UEs receiving RSAI, also referred to controlled UE(s) or UE-B(s), can be transmitted according to the following.

In one example 1.11.1, the RSAI from a UE-A is broadcast to one or more UE-B(s).

In another example 1.11.2, the RSAI from a UE is groupcast to one or more UE-B(s). In one example, there is one groupcast set. In another example, there is more than one groupcast set. A groupcast set is a set of UEs receiving a groupcast message containing the RSAI. In one example, a UE can belong to only one groupcast set. In another example a UE can belong to more than one groupcast set.

In another example 1.11.3, the RSAI from a UE is unicast to a UE-B. There can be one or more unicast links from a UE-A to one or more UE-B(s). Furthermore, there can be one or more unicast links from one or more UE-A(s) to a UE-B.

In another example 1.11.4, a UE-A can transmit RSAI to UE-B(s) using more than one of the previous schemes (of examples 1.11.1, 1.11.2 and 1.11.3). For example, a UE-A can transmit broadcast and groupcast RSAI. Alternatively, a UE-A can transmit broadcast and unicast RSAI. Alternatively, a UE-A can transmit groupcast and unicast RSAI. Alternatively, a UE-A can transmit broadcast, groupcast and unicast RSA.

In another example 1.11.5, a UE-B can receive RSAI from UE-A(s) using more than one of the previous schemes (of examples 1.11.1, 1.11.2, and 1.11.3). For example, a UE-B receive broadcast and groupcast RSAI. Alternatively, a UE-B can broadcast and unicast RSAI. Alternatively, a UE-B can receive groupcast and unicast RSAI. Alternatively, a UE-B can receive broadcast, groupcast and unicast RSAI.

Figure 9:
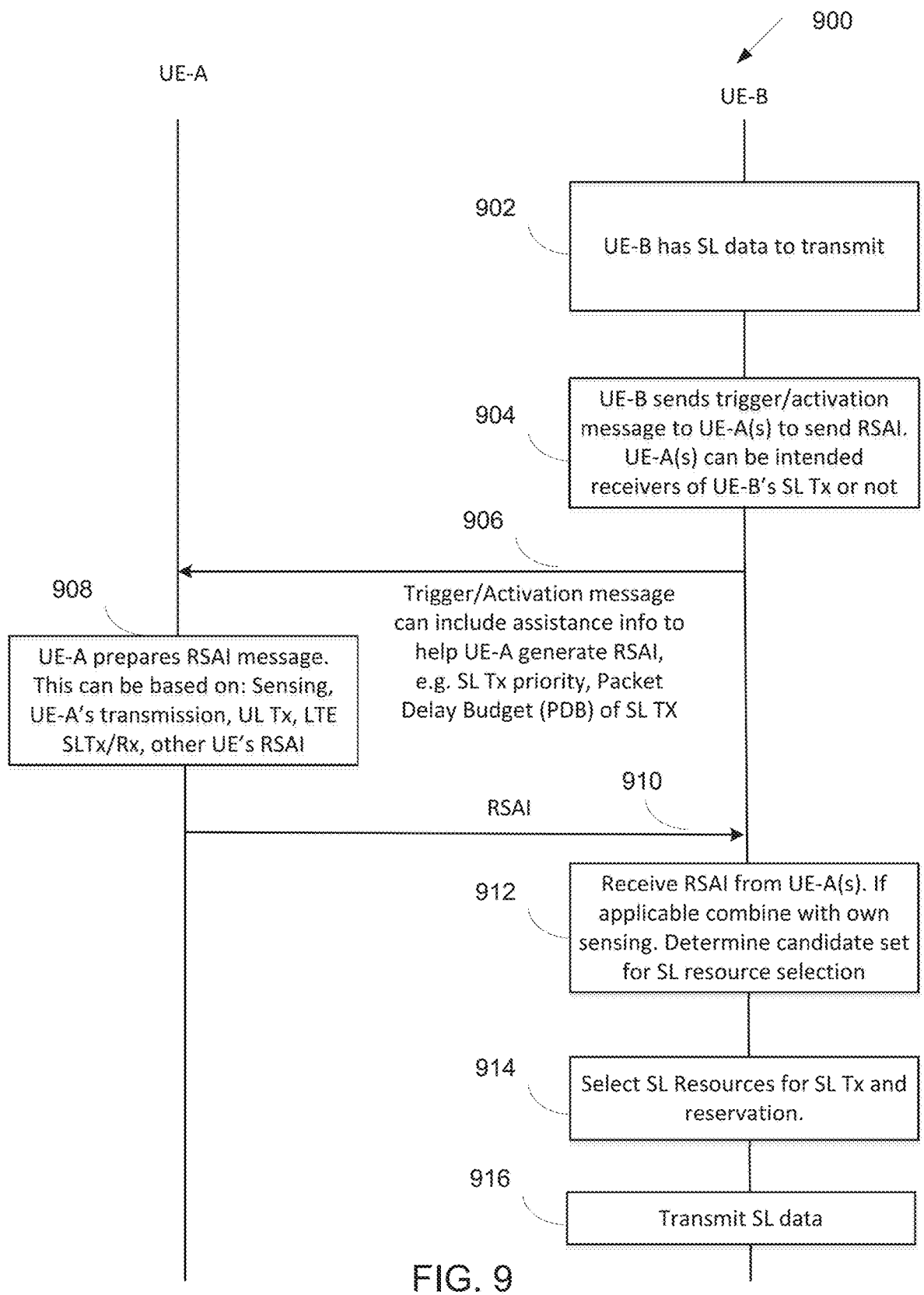
FIG. 9 illustrates an example signaling flow for a trigger/activation based inter-UE co-ordination procedure according to embodiments of the present disclosure.

FIG. 9 illustrates an example signaling flow 900 for a trigger/activation based inter-UE co-ordination procedure according to embodiments of the present disclosure. The signaling flow 900 may be performed by UEs (e.g., 111-116 as illustrated in FIG. 1). An embodiment of the signaling flow 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, a UE-B has SL data to transmit in step 902. In step 904, the UE-B sends trigger/activation message to UE-A(s) to send RSAI. UE-A(s) can be intended receivers of UE-B's SL Tx or not. In step 906, the UE-B sends trigger/activation message that can include assistance info to help UE-A generate RSAI, e.g., SL Tx priority, packet delay budget (PDB) of SL TX, periodicity of SL Tx, or other characteristics of SL Tx from UE-B. In step 908, a UE-A prepares RSAI message. This can be based on: (1) sensing performed by UE-A; (2) UE-A's NR SL transmissions/receptions; (3) UL Tx (e.g., UE-A's UL Tx or common UL Tx resources such as PRACH occasions); (4) UE-A's LTE SLTx/Rx; and/or (5) other UE's RSAI (e.g., inter-UE co-ordination information) received by UE-A. In step 910, the UE-A sends the RSAI (e.g., inter-UE-co-ordination information) to the UE-B. In step 912, the UE-B receives RSAI from the UE-A(s). If applicable combine with own sensing, the UE-B may determine candidate set for SL resource selection. In step 914, the UE-B select SL resources for SL Tx and reservation for transmission of SL data. In step 916, the UE-B transmits the SL data on the selected SL resource (e.g., first-in-time selected SL resource).

FIG. 9 is an example of a trigger/activation based inter-UE co-ordination procedure. In this example, a UE-B sends a trigger to UE-A(s) to provide RSAI (e.g., inter-UE co-ordination information) when the UE-B has SL data to transmit. A UE-A provides the data in response to the trigger/activation message from the UE-B. In a further example, the UE-B can send a deactivation message to stop the transmission of the RSAI message.

In response to a trigger/activation message from the UE-B, the UE-A can one of: (1) send RSAI once, or N times to the UE-B, (N>1); (2) send RSAI periodically to the UE-B until the UE-A receives a deactivation message from the UE-B to stop sending RSAI.

Figure 10:
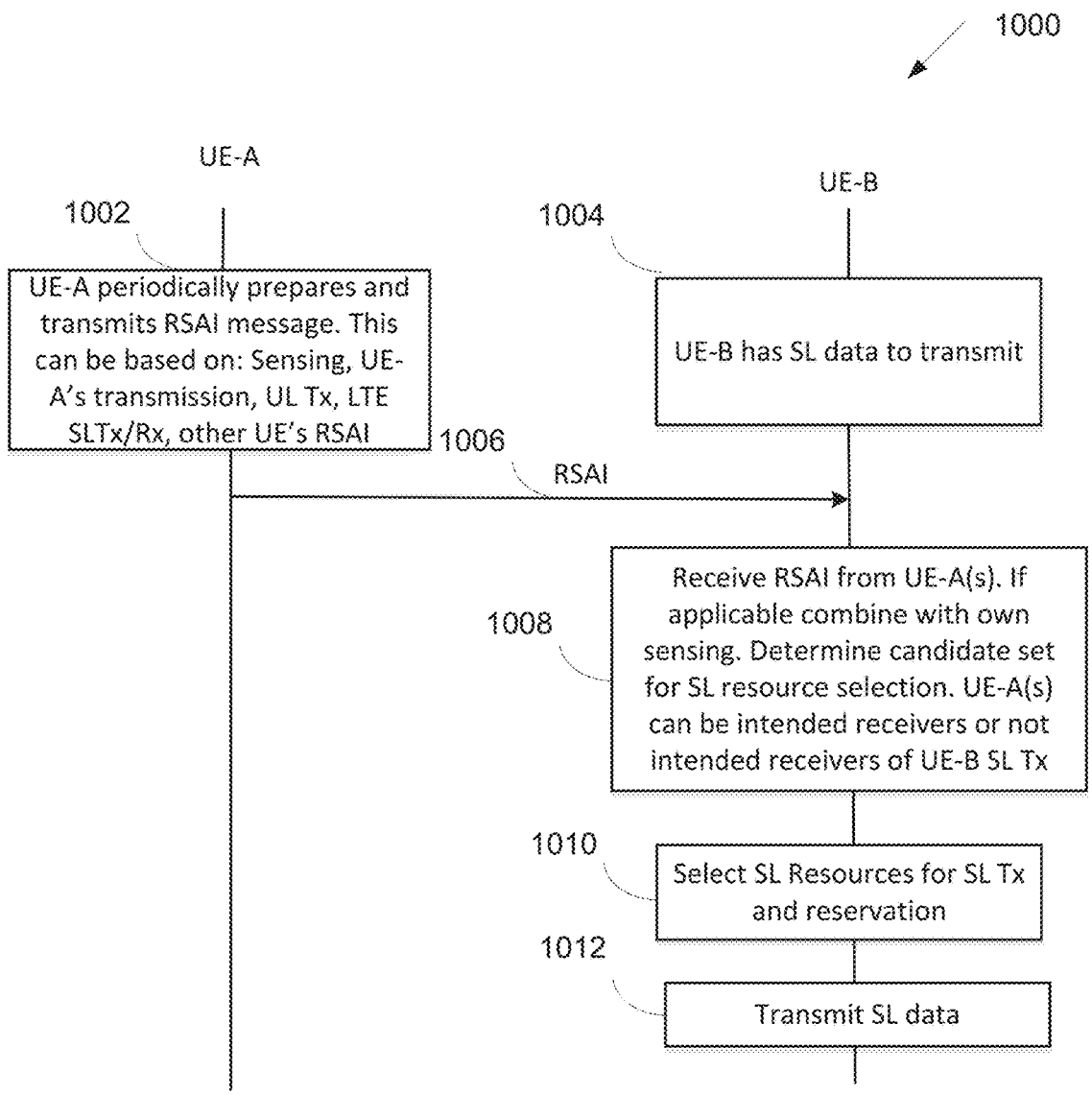
FIG. 10 illustrates an example signaling flow for a periodic-based inter-UE co-ordination procedure according to embodiments of the present disclosure.

FIG. 10 illustrates an example signaling flow 1000 for a periodic-based inter-UE co-ordination procedure according to embodiments of the present disclosure. The signaling flow 1000 may be performed by UEs (e.g., 111-116 as illustrated in FIG. 1). An embodiment of the signaling flow 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, in step 1002, a UE-A periodically prepares and transmits RSAI message. For example, RSAI can be inter-UE coordination information. This can be based on: (1) sensing performed by UE-A, (2) UE-A's NR SL transmissions/receptions, (3) UL Tx (e.g., UE-A's UL Tx or common UL Tx resources such as PRACH occasions), (4) UE-A's LTE SL Tx/Rx, and/or (5) other UE's RSAI (e.g., inter-UE co-ordination information) received by UE-A. In step 1004, a UE-B has SL data to transmit to the UE-A. In step 1006, the UE-A transmits the RSAI to the UE-B. This information can be transmitted periodically or semi-persistently with a period from UE-A. In step 1008, the UE-B receives the RSAI from the UE-A(s). If applicable combine with own sensing, the UE-B determines a candidate set for SL resource selection. The UE-A(s) can be intended receivers or not intended receivers of UE-B SL Tx. In step 1010, the UE-B selects SL Resources for SL Tx and reservation for a transmission of SL data. In step 1012, the UE-B transmits the SL data on the selected SL resource (e.g., first-in-time selected SL resource).

FIG. 10 is an example of a periodic-based inter-UE co-ordination procedure. A UE-A periodically provides RSAI to neighboring UE-B's. For example, RSAI can be inter-UE coordination information. When a UE-B has data to transmit, the UE-B uses the RSAI message from UE-A(s) for SL resource selection. The UE-A can be an infrastructure UE, e.g., RSU or a group leader for a group of UEs, or a UE configured to provide inter-UE co-ordination information.

In one embodiment, content of resource selection assistance information message is provided.

A UE, referred as a controlling UE or UE-A, can provide information to adjacent UEs, e.g., controlled UEs or UE-Bs, to assist adjacent UEs in performing resource selection, e.g., a UE provides RSAI to adjacent UEs. For example, RSAI can be inter-UE coordination information. In this example, the content of an RSAI message from the UE-A to the UE-B is considered In one example 2.1, the RSAI message contains sensing information, the sensing information can include information about the start time and end time of the sensing window. In one example, the start time and/or end time can be relative to a reference point. In another example, the start time and/or end time can be relative to the time of the transmission of the RSAI. In another example, a UE (i.e., UE-A) can provide the start time of the sensing window and the duration of the sensing window. The start time can be relative to a reference point or the time of the transmission of RSAI. In another example, a UE (i.e., UE-A) can provide the end time of the sensing window and the duration of the sensing window. The end time can be relative to a reference point or the time of the transmission of RSAI. In another example, only the start or end time of the sensing window is provided by a UE-A, the duration of the sensing window is previously configured by RRC signaling and/or MAC CE and/or L1 control signaling as part of the configuration described in the aforementioned embodiments and examples. The start or end time can be relative to a reference point or the time of the transmission of RSAI. In another example, only the duration of the sensing window is provided by A UE-A, the start or end time of the sensing window relative to the time of transmission of RSAI is previously configured by RRC signaling and/or MAC CE and/or L1 control signaling as part of the configuration described in the aforementioned embodiments and examples. In another example, no timing information for the sensing window is provided, the duration of the sensing window and the start or end time of the sensing window relative to the time of transmission of RSAI are previously configured by RRC signaling and/or MAC CE and/or L1 control signaling as part of the configuration described in the aforementioned embodiments and examples.

The slots can be numbered (indexed) as physical slots or logical slots, physical slots, include all slots numbered sequential, while logical slots include only slots allocated to sidelink (e.g., uplink slots, or slots with enough uplink symbols for sidelink transmission) not used for S-SSB and not reserved and after the application of the bit map numbered sequentially as previously described. Timing parameters can be provided in units of time, e.g., in seconds or milli-seconds, and/or can be provided in units of physical slots depending on the numerology of the sidelink, and/or can be provided in logical slots. Different units can be used for different timing parameters. The conversion of logic slots to physical time (if needed) and vice versa can follow the release 16 NR equation, i.e.

$$T'_{logical} = \left\lceil \frac{T'_{max}}{10240 \text{ ms}} \times T_{ms} \right\rceil,$$

where, $T_{ms}$ is a period in milli-seconds, $T_{logical}'$ is the corresponding number of logical slots, and $T_{max}'$ is the number of slots that belong to a resource pool within 1024 radio frames.

In one example 2.1, the RSAI message contains sensing information, the sensing information can include information about the slots sensed or slots not-sensed during the sensing window. For example, slots are not sensed during the sensing window due to the controlling UE, i.e., A UE-A, own transmission. In one example, this information can be included in a bitmap, with one bit for each slot in the sensing window. A slot that is not sensed can have one logical value (e.g., 1 or 0), a slot sensed can have the negation of that logical value (e.g., 0 or 1 respectively). In another example, this information can be included in a list of slots within the sensing window, the list of slots includes the slots that were not sensed. Alternatively, the list of slots can include the slots that were sensed.

In one example 2.1, the RSAI message contains sensing information, the sensing information can include information about the detected SCI receptions during the sensing window. In one example, this can include a list of successfully decoded SCIs on PSCCH within the sensing window including for each successfully decoded SCI on PSCCH some or all of the following parameters: (1) the resource(s) of the decoded SCI and its associated PSSCH, i.e., sub-channels and slots; (2) any additional reserved resources as indicated by the decoded SCI; (3) the "Resource reservation period" field in the decoded SCI if present; (4) the "Priority" field in the decoded SCI; and/or (5) the RSRP measurement associated with the decoded SCI. The RSRP measurement can be measured over PSCCH DMRS referred as PSCCH-RSRP. Alternatively, the RSRP measurement can be measured over PSSCH DMRS referred as PSSCH-RSRP.

In another example, the UE providing the RSAI, i.e., UE-A, is provided an RSRP threshold. The UE-A provides a list of successfully decoded SCIs on PSCCH within the sensing window with RSRP that exceeds the RSRP threshold. For each successfully decoded SCI on PSCCH with RSRP that exceeds the threshold, some or all of the following parameters can be included: (1) the resource(s) of the decoded SCI and its associated PSSCH, i.e., sub-channels and slots; (2) any additional reserved resources as indicated by the decoded SCI; (3) the "Resource reservation period" field in the decoded SCI if present; and/or (4) the "Priority" field in the decoded SCI. The RSRP threshold can be based on PSCCH DMRS RSRP or PSSCH DMRS RSRP. In a further example, a UE-A is configured, by RRC signaling and/or MAC CE signaling and/or L1 signaling, with a set of RSRP thresholds, with a threshold associated with each "Priority" in a decoded SCI. For each successfully decoded SCI in PSCCH, with a "Priority" field having a value $P_{prio}$ (or a value that equals or is less than $P_{prio}$ with a lower priority value indicating a higher priority), and RSRP that exceeds the RSRP threshold associated with $P_{prio}$, some or all of the above parameters can be included in the RSAI message.

In another example, the UE providing the RSAI, i.e., UE-A, is provided a priority of a transmission in a UE receiving the RSAI message, i.e., UE-B. UE-A is further configured, by RRC signaling and/or MAC CE signaling and/or L1 signaling, with a set of RSRP thresholds, with a threshold associated with each transmitting priority in a UE-B. The UE-A provides a list of successfully decoded SCIs on PSCCH within the sensing window with RSRP that exceeds the RSRP threshold corresponding to the provided priority in the UE-B. The UE-B transmission priority can be provided to UE-A in the message triggering or activating the transmission of RSAI (e.g., example 1.9.2), alternatively the UE-B can be provided in the message configuring the provision and transmission of RSAI as described in the aforementioned embodiments and examples.

For each successfully decoded SCI on PSCCH with RSRP that exceeds the threshold of the provided priority in the UE-B, some or all of the following parameters can be included: (1) the resource(s) of the decoded SCI and its associated PSSCH, i.e., sub-channels and slots; (2) any additional reserved resources as indicated by the decoded SCI; (3) the "Resource reservation period" field in the decoded SCI if present; and/or (4) the "Priority" field in the decoded SCI. The RSRP threshold can be based on PSCCH DMRS RSRP or PSSCH DMRS RSRP.

In a further example, a UE-A is configured, by RRC signaling and/or MAC CE signaling and/or L1 signaling, with a set of RSRP thresholds, with a threshold associated with each priority pair, where a priority pair corresponds to the provided priority of transmission in a UE-B and the "Priority" in a decoded SCI. For each successfully decoded SCI in PSCCH, with a "Priority" field having a value $P_{prio}$, and RSRP that exceeds the threshold associated with $P_{prio}$ and the provided priority of UE-B transmission, some or all of the above parameters can be included in the RSAI message.

In a further example 2.1.1, a UE can report sensing information for each group of single-slot resources, the grouping can be across sub-channels and/or slots. The grouping can be specified in the system specifications and/or configured/updated by RRC signaling and/or MAC CE signaling and/or L1 control signaling.

For each group of single-slot resources a UE-A can include in the RSAI: (1) whether SCI has been successfully decoded in any single-slot resource within the group of single-slot resources. If successfully decoded, this can also include the single-slot resources with successfully decoded SCI within the group of single-slot resources. In another example, this can include an index of the successfully decoded single-slot resource with the highest RSRP; (2) a priority value associated with the group of single-slot resources, the priority value can be determined based on the "priority" field of the successfully decoded SCIs, if any, within the group of single-slot resources. For example, this can be the lowest priority value among the successfully decoded SCIs, a lower priority value indicates traffic of higher priority. In another example, this can correspond to the "priority" field of a decoded SCI with the highest RSRP; (3) a period ("Resource reservation period") associated with the group of single-slot resources, the period can be determined based on the "Resource reservation period" field of the successfully decoded SCIs within the group of single-slot resources. In one example, this can correspond to the "Resource reservation period" field of a decoded SCI with the highest RSRP. In another example, this can correspond to the "Resource reservation period" field of a decoded SCI with the lowest priority value, a lower priority value indicates traffic of higher priority. In another example, this can respond to smallest "Resource reservation period" of a successfully decoded SCI; (4) Additional reserved resources associated with the group of single-slot resources, the additional reserved resources are signaled in the decoded SCI. In one example, this can correspond to the decoded SCI with the highest RSRP. In another example, this can correspond to the decoded SCI with the lowest priority value, a lower priority value indicates traffic of higher priority. In another example, this can correspond to the union of all reserved resources in the successfully decoded SCIs; and/or (5) RSRP associated with the group of single-slot resources. In one example, this can correspond to the highest RSRP of a successfully decoded SCI. In another example, this can correspond to the RSRP of a decoded SCI with the lowest priority value, a lower priority value indicates traffic of higher priority. In another example this can be the average RSRP, or the median RSRP, or the mode RSRP, of the successfully decoded SCIs. The RSRP can be based on PSCCH DMRS RSRP or PSSCH DMRS RSRP.

Figure 11:
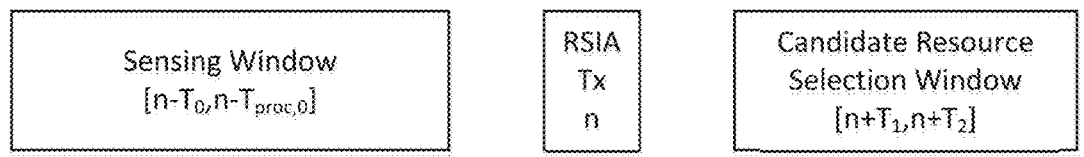
FIG. 11 illustrates an example for a sending window and a candidate resource selection window according to embodiments of the present disclosure.

FIG. 11 illustrates an example for a sensing window and a candidate resource selection window 1100 according to embodiments of the present disclosure. An embodiment of the sensing window and the candidate resource selection window 1100 shown in FIG. 11 is for illustration only.

In one example 2.2, the RSAI message from a UE-A contains resource selection information within a candidate resource selection window as shown in FIG. 11. Additional examples are described in U.S. application Ser. No. 17/224,983 filed on Apr. 7, 2021, which incorporated herein by reference.

In FIG. 11, for the transmission of RSAI that is in slot n, the RSAI includes candidate resources within a candidate resource selection window [n+$T_1$, n+$T_2$] based on sensing performed in a window [n–$T_0$, n–$T_{proc,0}$]. A UE performs sensing and resource selection according to the procedures described in release 16 for sidelink resource selection in 3GPP standard specifications. Wherein, the RSAI can include information about the start time and end time of the resource selection window. In one example, the start time and/or end time can be relative to a reference point. In another example, the start time and/or end time can be relative to the time of the transmission of the RSAI. In another example, a UE (i.e., UE-A) can provide the start time of the resource selection window and the duration of the resource selection window. Wherein, the start time can be relative to a reference point or the time of the transmission of RSAI. In another example, a UE (i.e., UE-A) can provide the end time of the resource selection window and the duration of the resource selection window. The end time can be relative to a reference point or the time of the transmission of RSAI. In another example, only the start or end time of the resource selection window is provided by a UE-A, the duration of the resource selection window is previously configured by RRC signaling and/or MAC CE and/or L1 control signaling as part of the configuration described in the aforementioned embodiments and examples. Wherein, the start or end time can be relative to a reference point or the time of the transmission of RSAI. In another example, only the duration of the resource selection window is provided by a UE-A, the start or end time of the resource selection window relative to the time of transmission of RSAI is previously configured by RRC signaling and/or MAC CE and/or L1 control signaling as part of the configuration described in the aforementioned embodiments and examples. In another example, no timing information for the resource selection window is provided, the duration of the resource selection window and the start or end time of the resource selection window relative to the time of transmission of RSAI are previously configured by RRC signaling and/or MAC CE and/or L1 control signaling as part of the configuration described in the aforementioned embodiment.

The slots can be numbered (indexed) as physical slots or logical slots, physical slots, include all slots numbered sequential, while logical slots include only slots that can be allocated to sidelink (e.g., uplink slots, or slots with enough uplink symbols for sidelink transmission) not used for S-SSB and not reserved and after the application of the bit map numbered sequentially as previously described. Timing parameters can be provided in units of time, e.g., in seconds or milli-seconds, and/or can be provided in units of physical slots depending on the numerology of the sidelink, and/or can be provided in logical slots. Different units can be used for different timing parameters. The conversion of logic slots to physical time (if needed) and vice versa can follow the release 16 NR equation, i.e.

$$T'_{logical} = \left\lceil \frac{T'_{max}}{10240 \text{ ms}} \times T_{ms} \right\rceil$$

where, $T_{ms}$ is a period in milli-seconds, $R_{logical}'$ is the corresponding number of logical slots, and $T_{max}'$ is the number of slots that belong to a resource pool within 1024 radio frames.

In the aforementioned examples as illustrated in FIG. 11, the RSAI can include information about available single-slot resources in the candidate resource selection window according to the resource selection procedure described in 3GPP standard specifications. In one example, this information can correspond to a single transmission priority level, a UE-A is provided a transmission priority level, i.e., transmission priority level of a sidelink resource in a UE-B for which candidate resources are being selected within the candidate resource selection window in a UE-A. The UE-A uses the transmission priority level to determine the available single-slot resources within the candidate resource selection window. The UE-A determines one set of available single-slot resources in the candidate resource selection window corresponding to the transmission priority level. For example, the UE-B transmission priority can be provided to UE-A in the message triggering or activating the transmission of RSAI (e.g., example 1.9.2), alternatively the UE-B can be provided in the message configuring the provision and transmission of RSAI as described in the aforementioned embodiments and examples.

In another example, this information can correspond to multiple transmission priority levels, a UE-A is provided multiple transmission priority levels, i.e., transmission priority level of a sidelink resource in a UE-B for which candidate resources are being selected within the candidate resource selection window in the UE-A. The UE-A uses each transmission priority level to determine the available single-slot resources within the candidate resource selection window. The UE-A determines multiple sets of available single-slot resources in the candidate resource selection window, with one set corresponding to one transmission priority level. For example, the multiple transmission priority levels can be provided to UE-A in the message triggering or activating the transmission of RSAI (e.g., example 1.9.2), alternatively it can be provided in the message configuring the provision and transmission of RSAI as described in in the aforementioned embodiments and examples.

In one example, the set of single-slot resources available for each transmission priority-level can be signaled by a bitmap, with one bit corresponding to a single-slot resource in the candidate resource selection window. A single-slot resource that is available (e.g., preferred resource) in the candidate resource selection window can have one logical value (e.g., 1 or 0), a single-slot resource that is not available (e.g., not preferred resource) in (i.e., excluded from) the candidate resource selection window can have the negation of that logical value (e.g., 0 or 1 respectively). In case of multiple transmission priority levels, there can be multiple bitmaps, one bitmap can correspond to a transmission priority level.

In another example, this information can be included in a list of single-slot resources within the candidate resource selection window, the list of single-slot resources includes the single-slot resources that are available (i.e., preferred). Alternatively, the list of single-slot resources can include the single-slot resources that are not available in (i.e., excluded from or not preferred) the candidate resource selection window. In case of multiple transmission priority levels, there can be multiple lists, one list can correspond to a transmission priority level. In another example, a list of single-slot resources within the candidate resource selection window, the list of single-slot resources includes the single-slot resources that are not available in (i.e., excluded from or not preferred) the candidate resource selection window for at least one priority level, and information about the priority levels for which this single-slot resource is excluded. For example, this can be the lowest SCI decode priority (highest priority value, a lower priority value indicates traffic of higher priority) for which the resource is excluded.

In another example, a list of single-slot resources within the candidate resource selection window, the list of single-slot resources includes the single-slot resources that are available (e.g., preferred) in the candidate resource selection window for at least one priority level, and information about the priority levels for which this single-slot resource is available. For example, this can be the highest SCI decode priority (lowest priority value, a lower priority value indicates traffic of higher priority) for which the resource is available. In another example, a list of single-slot resources within the candidate resource selection window, and for each single slot resource information about the priority levels for which this single-slot resource is available (i.e. preferred) or excluded (i.e. not preferred). For example, this can be the highest SCI decode priority (lowest priority value, a lower priority value indicates traffic of higher priority) for which the resource is available. Alternatively, this can be the lowest SCI decode priority (highest priority value, a lower priority value indicates traffic of higher priority) for which the resource is excluded.

In the aforementioned examples as illustrated in FIG. 11, the RSAI can include information about resources excluded from (not available in) a candidate resource selection window that only correspond to slots within the sensing window that a UE-A has not monitored, as described in 3GPP standard specification.

Figure 12:
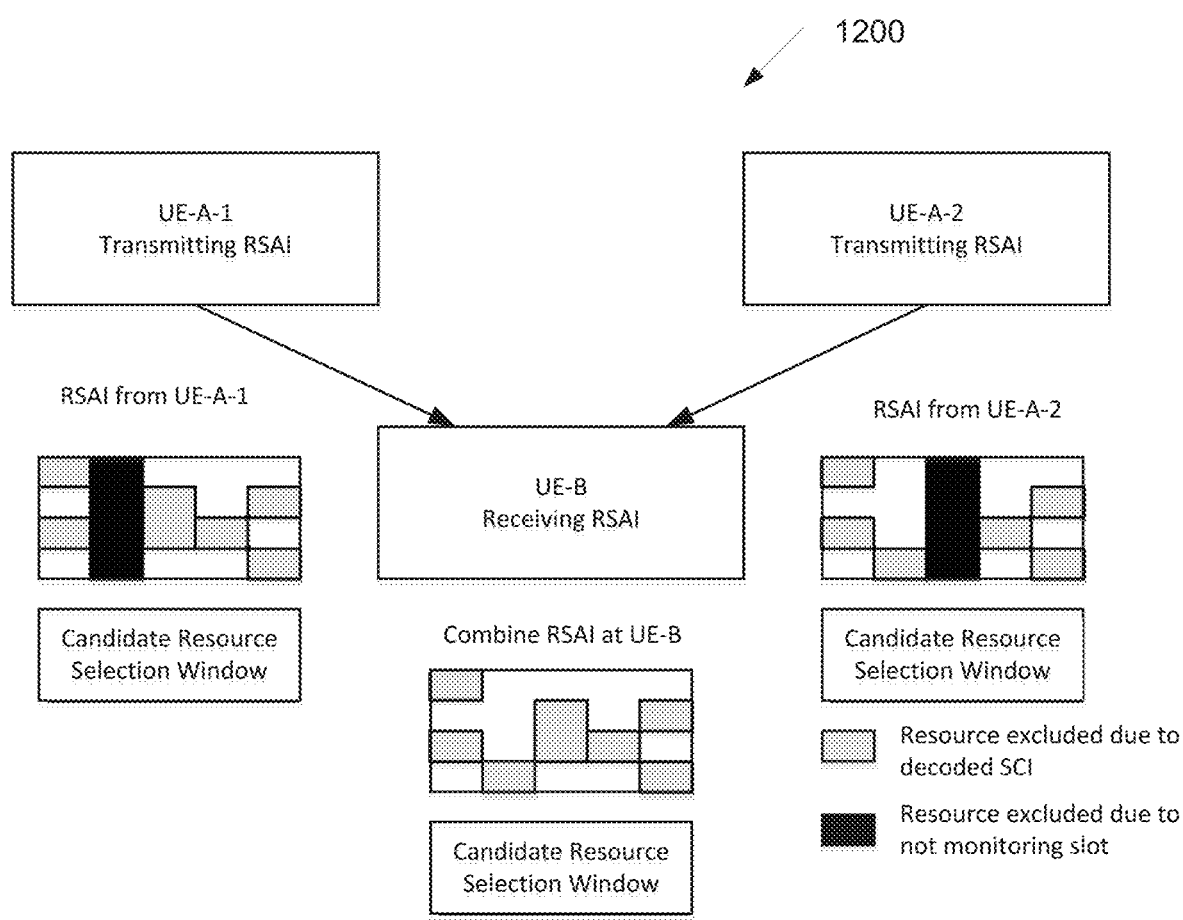
FIG. 12 illustrates an example resources allocation according to embodiments of the present disclosure.

In the resource selection procedure as described in 3GPP standard specification, resources can be excluded from a candidate resource selection window due to slots not monitored within the sensing window (as defined in 3GPP standard specification), or due to decoded SCI that exceeds an RSRP threshold (as defined in 3GPP standard specification). Identifying the former can allow a UE-B to include these resources in a candidate set if the UE-B can determine otherwise that these resources are available e.g., based on the UE-B's own sensing, if any, or if these resources are signaled as available by another UE-A. FIG. 12 is an example of UE-B receiving RSAI from two UEs, a UE-A-1 and a UE-A-2. The two UEs are assumed to have the same candidate resource selection window time location. A grey resource (as illustrated in FIG. 12) is a resource excluded due to a decoded SCI (as defined in 3GPP standard specification).

While a resource (black resource as illustrated in FIG. 12) is a resource excluded due to a slot not being monitored (as defined in 3GPP standard specification). At UE B, the RSAI is merged from a UE-A-1 and a UE-A-2. One such rule can be a single-slot resource excluded due to a decoded SCI from either or both UE-As is excluded from the candidate resources (these correspond to grey resources, as illustrated in FIG. 12, from at least one UE-A). A single-slot resource not excluded from one UE-A but excluded from the other UE-A due to not monitoring a slot is not excluded from the candidate resources (these correspond to black resources, as illustrated in FIG. 12, from one UE-A only and white resources from the other UE). A single-slot resource excluded from one UE-A due to a decoded SCI and excluded from the other UE-A due to not monitoring a slot is excluded from the candidate resources (these correspond to resources that are grey from one UE-A and black resources (as illustrated in FIG. 12) from the other UE-A). A single-slot resource excluded due to not monitoring a slot from both UE-As can be excluded from the candidate resources (these correspond to black resources from both UEs)—not shown in FIG. 12. The resource allocation scheme illustrated in FIG. 12 is summarized in Table 1 below:

TABLE 1

| Resource from UE-A-1 | Resources from UE-A-2 | Final outcome at UE-B |
|---|---|---|
| White: Resource available | White: Resource available | White: Resource available (preferred) |
| Grey: Resource excluded due to decoded SCI | Grey: Resource excluded due to decoded SCI | Grey: Resource not available (not preferred) |
| Black: Resource excluded due to not monitoring | Black: Resource excluded due to not monitoring | |
| White | White | White |
| White | Grey | Grey |
| White | Black | White |

TABLE 1-continued

| Resource from UE-A-1 White: Resource available Grey: Resource excluded due to decoded SCI Black: Resource excluded due to not monitoring | Resources from UE-A-2 White: Resource available Grey: Resource excluded due to decoded SCI Black: Resource excluded due to not monitoring | Final outcome at UE-B White: Resource available (preferred) Grey: Resource not available (not preferred) |
|---|---|---|
| Grey | White | Grey |
| Grey | Grey | Grey |
| Grey | Black | Grey |
| Black | White | White |
| Black | Grey | Grey |
| Black | Black | Grey |

FIG. 12 illustrates an example resource allocation 1200 according to embodiments of the present disclosure. The resources allocation 1200 may be performed by UEs (e.g., 111-116 as illustrated in FIG. 1). An embodiment of the resources allocation 1200 shown in FIG. 12 is for illustration only.

Information about resources excluded from (not available in) a candidate resource selection window that only correspond to slots within the sensing window that the UE-A has not monitored can be signaled as follows.

In one example, this information can be included in a bitmap, with one bit for each slot in the candidate resource selection window. A slot that is excluded from a candidate resource selection window due to this condition can have one logical value (e.g., 1 or 0), a slot that is not excluded from the candidate resource selection window due to this condition can have the negation of that logical value (e.g., 0 or 1 respectively). Alternatively, this information can be included in a list of slots within the candidate resource selection window, the list of slots includes the slots that were excluded due to this condition. Alternatively, the list of slots can include the slots that are not excluded due to this condition.

In another example, this information can be included in a bitmap, with one bit for each single-slot resource in the candidate resource selection window. A single-slot resource that is excluded from a candidate resource selection window due to this condition can have one logical value (e.g., 1 or 0), a single-slot resource that is not excluded from the candidate resource selection window due to this condition can have the negation of that logical value (e.g., 0 or 1 respectively). Alternatively, this information can be included in list of single-slot resources within the candidate resource selection window, the list of single-slot resources includes the single-slot resources that were excluded due to this condition. Alternatively, the list of single-slot resources can include the single-slot resources that are not excluded due to this condition.

In another example, list of single-slot resources within the candidate resource selection window can combine exclusion due to a decoded SCI (as defined in 3GPP standard specification), one value can correspond to this condition, and exclusion only due to a slot not being monitored (as defined in 3GPP standard specification), another value can correspond to this condition. A third value can correspond to single-slot resources that are available within the candidate resource selection window.

In one example 2.3, the RSAI message (e.g., inter-UE co-ordination message) sent from the UE-A to the UE-B can be one of the following.

In one example of case 1, a UE-A includes in the RSAI message preferred SL resources, a UE-B can select SL resources from the preferred sidelink resources for SL transmission from the UE-B. In one such example, the UE-B may further consider resources available based on the UE-B's own sensing (e.g., candidate resources after resource exclusion at the UE-B based on the UE-B's own sensing). For example, SL resources selected, at UE-B, for SL transmission and/or reserved are those indicated as preferred resources from the UE-A and as candidate resources based on the UE-B's own sensing.

In another such example, the UE-B may further consider inter-UE co-ordination messages received from other UE-A's. In this example, SL resources selected, at UE-B, for SL transmission and/or reserved are those indicated as preferred resources from a first UE-A and as preferred resources from a second UE-A. In an alternative example, SL resources selected, at UE-B, for SL transmission and/or reserved are those indicated as preferred resources from a first UE-A and are not indicated as non-preferred resource from a second UE-A.

In another such example, the UE-B may further consider inter-UE co-ordination messages received from other UE-A's as well as resources available based on the UE-B's sensing (e.g., candidate resources after resource exclusion at the UE-B based on the UE-B's sensing). In this example, SL resources selected, at UE-B, for SL transmission and/or reserved are those indicated as preferred resources from a first UE-A and are indicated as preferred resources from a second UE-A and are in the candidate resources based on the UE-B's own sensing. In an alternative example, SL resources selected, at UE-B, for SL transmission and/or reserved are those indicated as preferred resources from a first UE-A and are not indicated as non-preferred resource from a second UE-A and are in the candidate resources based on the UE-B's own sensing.

Figure 13:
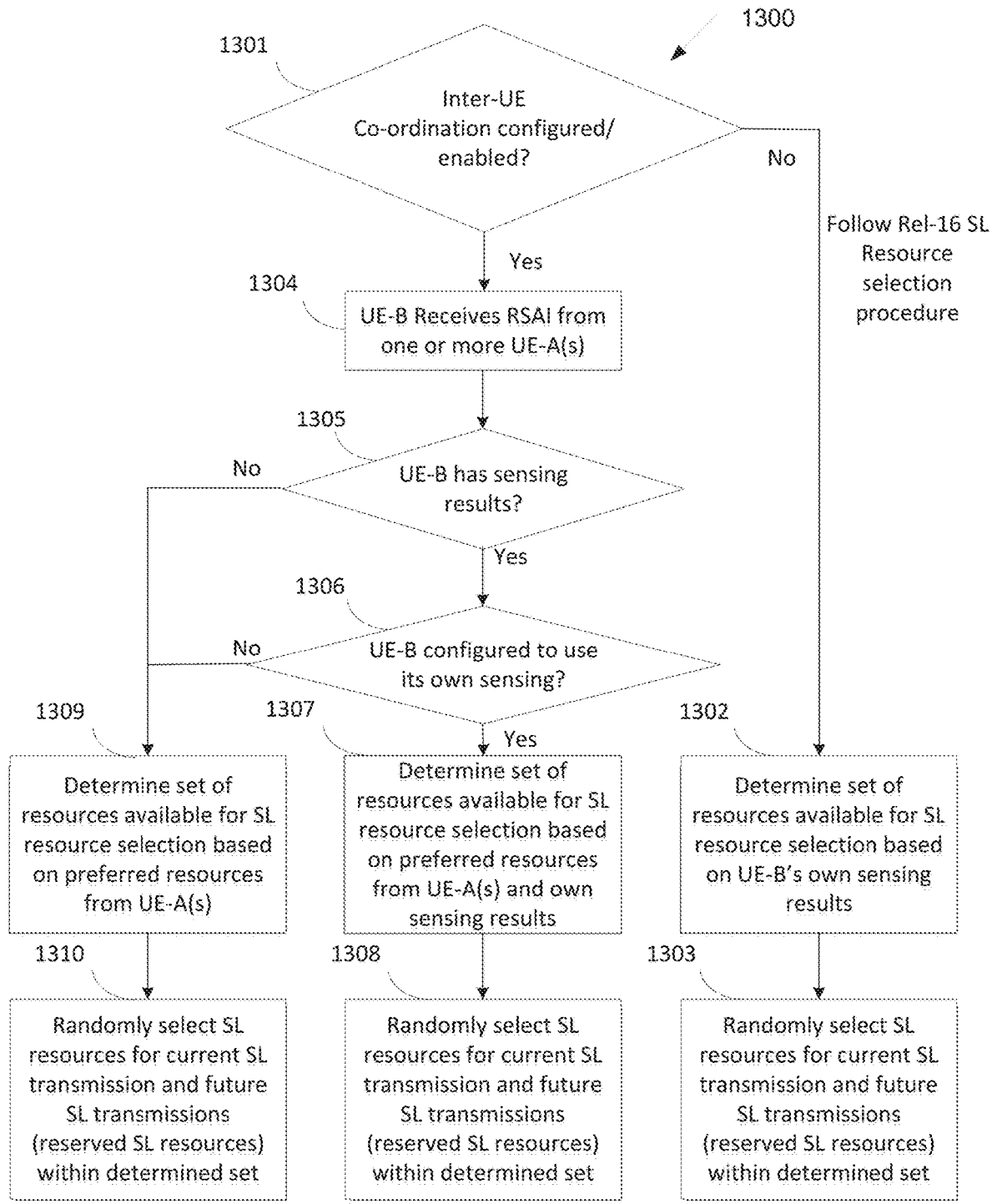
FIG. 13 illustrates an example flowchart of a process for inter-UE co-ordination according to embodiments of the present disclosure.

FIG. 13 illustrates an example flowchart of a process 1300 for inter-UE co-ordination according to embodiments of the present disclosure. The process 1300 may be performed by UEs (e.g., 111-116 as illustrated in FIG. 1). An embodiment of the process 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

UE-B checks if inter-UE co-ordination is (pre-)configured and enabled (1301). The configuration of inter-UE co-ordination can be by higher layers. The enabling of inter-UE co-ordination can be based on additional checks in the physical layer and higher layers (e.g., based on HARQ-ACK error rate a high HARQ-ACK error rate can enable inter-UE co-ordination).

If inter-UE co-ordination is not configured or not enabled, UE-B follows the Rel-16 resource selection procedure, by determining candidate SL resources within the resource selection window (1302), and randomly selecting resources for current and future SL transmissions within the available candidate resources in the resource selection window (1303).

If inter-UE co-ordination is configured and enabled, UE-B can optionally send a trigger or activation message to UE-A to send RSAI (as illustrated in FIG. 9) or UE-A can be sending RSAI without a trigger/activation from UE-B (as illustrated in FIG. 10).

UE-B receives resource selection assistance information (i.e. inter-UE co-ordination information) from one or more UE-As (1304). Inter-UE co-ordination information can include preferred resources.

UE-B can check if it has sensing results available (1305), UE-B can check if it has been configured to use its own sensing with the inter-UE co-ordination information (1306). One or more of these checks may not need to be performed. For example, by design, UE-B can always be configured to perform sensing when it is configured to use its sensing results with the inter-UE co-ordination information. Alternatively, if UE-B has sensing results available it can, by design, use the sensing results with the inter-UE co-ordination information with no further configuration.

If UE-B is configured to use its own sensing results and has sensing results available: UE-B determines the candidate SL resources available within a resource selection window (1307). For example, this can be based on the intersection of the preferred resources from each UE-A as well as the available resources based on UE-B's own sensing. Other methods for determining the candidate SL resources available within a resource selection window based on the preferred resources from UE-A(s) and UE-B's own sensing results are not precluded. UE-B selects randomly SL resources for the current SL transmission and future SL transmissions (resources for future SL transmissions can be indicated as reserved in the current SL transmission) from within the candidate SL resources available within the resource selection window (1308). The current SL transmission is transmitted on the first-in-time of the randomly selected SL resources.

If UE-B is not configured to use its own sensing results or doesn't have sensing results available: UE-B determines the candidate SL resources available within a resource selection window (1309). For example, this can be based on the intersection of the preferred resources from each UE-A. Other methods for determining the candidate SL resources available within a resource selection window based on the preferred resources from UE-A(s) are not precluded. UE-B selects randomly SL resources for the current SL transmission and future SL transmissions (resources for future SL transmissions can be indicated as reserved in the current SL transmission) from within the candidate SL resources available within the resource selection window (1310). The current SL transmission is transmitted on the first-in-time of the randomly selected SL resources.

In one example of case 2, a UE-A includes in the RSAI message non-preferred SL resources, a UE-B can select SL resources for SL transmission from the UE-B that avoid (do not include) the non-preferred SL resources.

In one such example, the UE-B may further consider resources available based on the UE-B's own sensing (e.g., candidate resources after resource exclusion at the UE-B based on the UE-B's own sensing). For example, SL resources selected, at UE-B, for SL transmission and/or reserved are those in the candidate resources based on the UE-B's own sensing but are not indicated as non-preferred resources from a UE-A (e.g., exclude non-preferred resources from UE-A(s) from the candidate set of resources based on the UE-B's own sensing).

In another such example, the UE-B may further consider inter-UE co-ordination messages received from other UE-A's. For example, SL resources selected, at UE-B, for SL transmission and/or reserved are those not indicated as non-preferred resources from a first UE-A and are not indicated as non-preferred resources from a second UE-A. In another example, SL resources selected, at UE-B, for SL transmission and/or reserved are those not indicated as non-preferred resources from a first UE-A and are indicated as preferred resource from a second UE-A.

In another such example, the UE-B may further consider inter-UE co-ordination messages received from other UE-A's as well as resources available based on the UE-B's own sensing (e.g., candidate resources after resource exclusion at the UE-B based on the UE-B's sensing). For example, SL resources selected, at UE-B, for SL transmission and/or reserved are those not indicated as non-preferred resources from a first UE-A and are not indicated as non-preferred resources from a second UE-A and are in the candidate resources based on the UE-B's own sensing. In another example, SL resources selected, at UE-B, for SL transmission and/or reserved are those not indicated as non-preferred resources from a first UE-A and are indicated as preferred resource from a second UE-A and are in the candidate resources based on the UE-B's own sensing.

Figure 14:
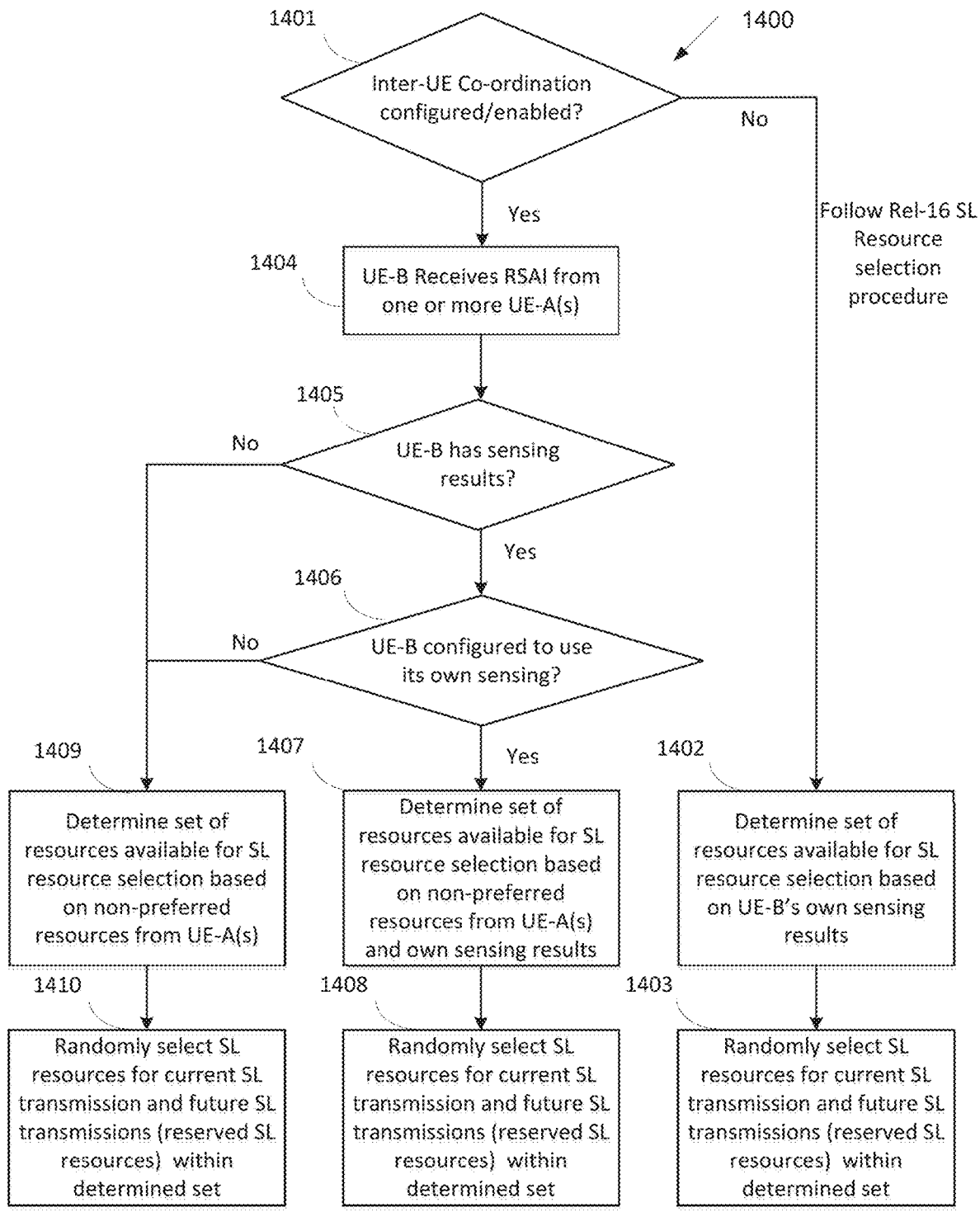
FIG. 14 illustrates an example flowchart of a process for inter-UE co-ordination according to embodiments of the present disclosure.

FIG. 14 illustrates an example flowchart of a process 1400 for inter-UE co-ordination according to embodiments of the present disclosure. The process 1400 may be performed by UEs (e.g., 111-116 as illustrated in FIG. 1). An embodiment of the process 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

UE-B checks if inter-UE co-ordination is (pre-)configured and enabled (1401). The configuration of inter-UE co-ordination can be by higher layers. The enabling of inter-UE co-ordination can be based on additional checks in the physical layer and higher layers (e.g., based on HARQ-ACK error rate a high HARQ-ACK error rate can enable inter-UE co-ordination).

If inter-UE co-ordination is not configured or not enabled, UE-B follows the Rel-16 resource selection procedure, by determining candidate SL resources within the resource selection window (1402), and randomly selecting resources for current and future SL transmissions within the available candidate resources in the resource selection window (1403).

If inter-UE co-ordination is configured and enabled, the following steps are followed. UE-B can optionally send a trigger or activation message to UE-A to send RSAI (as illustrated in FIG. 9) or UE-A can be sending RSAI without a trigger/activation from UE-B (as illustrated in FIG. 10). UE-B receives resource selection assistance information (i.e. inter-UE co-ordination information) from one or more UE-As (1404). Inter-UE co-ordination information can include non-preferred resources.

UE-B can check if it has sensing results available (1405), UE-B can check if it has been configured to use its own sensing with the inter-UE co-ordination information (1406). One or more of these checks may not need to be performed.

For example, by design, UE-B can always be configured to perform sensing when it is configured to use its sensing results with the inter-UE co-ordination information. Alternatively, if UE-B has sensing results available it can, by design, use the sensing results with the inter-UE co-ordination information with no further configuration.

If UE-B is configured to use its own sensing results and has sensing results available, UE-B determines the candidate SL resources available within a resource selection window (1407). For example, this can be based on the exclusion, from the candidate resources within the resource selection window, of the non-preferred resources from each UE-A and taking into account the available resources based on UE-B's own sensing. Other methods for determining the candidate SL resources available within a resource selection window based on the non-preferred resources from UE-A(s) and UE-B's own sensing results are not precluded. UE-B selects randomly SL resources for the current SL transmission and future SL transmissions (resources for future SL transmissions can be indicated as reserved in the current SL transmission) from within the candidate SL resources available within the resource selection window (1408). The current SL transmission is transmitted on the first-in-time of the randomly selected SL resources.

If UE-B is not configured to use its own sensing results or doesn't have sensing results available, UE-B determines the candidate SL resources available within a resource selection window (1409). For example, this can be based on the exclusion, from the candidate resources within the resource selection window, of the non-preferred resources from each UE-A. Other methods for determining the candidate SL resources available within a resource selection window based on the non-preferred resources from UE-A(s) are not precluded. UE-B selects randomly SL resources for the current SL transmission and future SL transmissions (resources for future SL transmissions can be indicated as reserved in the current SL transmission) from within the candidate SL resources available within the resource selection window (1410). The current SL transmission is transmitted on the first-in-time of the randomly selected SL resources.

In one example of case 3, a UE-A includes in the RSAI message a combination of preferred SL resources and non-preferred SL resources, wherein: (1) first, the UE-B can select SL resources from the preferred sidelink resources for SL transmission from the UE-A; (2) second, if no SL resources are available for SL transmission in the preferred SL resources, the UE-A can select SL resources for SL transmission from the UE-B that avoid (do not include) the non-preferred SL resources; (3) the UE-B may further consider candidate resources based on the UE-B's own sensing for the first step and second step; (4) the UE-B may consider preferred or non-preferred resources from more than one UE-A for the first step and the second step; and/or (5) the UE-B may consider preferred or non-preferred resources from more than one UE-A as well as candidate resources based on the UE-B's own sensing for the first step and second step.

Figure 15:
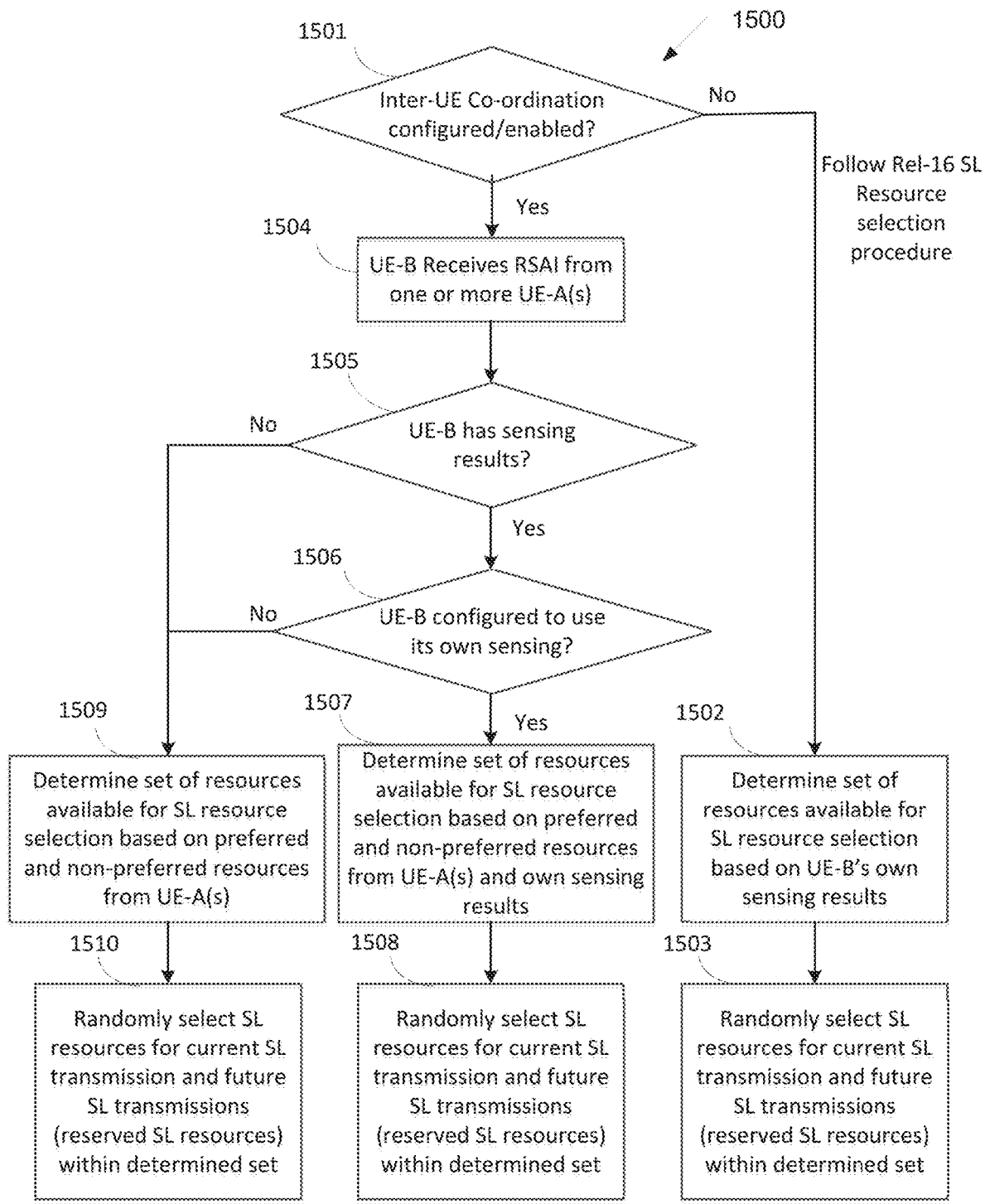
FIG. 15 illustrates an example flowchart of a process for inter-UE co-ordination according to embodiments of the present disclosure.

FIG. 15 illustrates an example flowchart of a process 1500 for inter-UE co-ordination according to embodiments of the present disclosure. The process 1500 may be performed by UEs (e.g., 111-116 as illustrated in FIG. 1). An embodiment of the process 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

UE-B checks if inter-UE co-ordination is (pre-)configured and enabled (1501). The configuration of inter-UE co-ordination can be by higher layers. The enabling of inter-UE co-ordination can be based on additional checks in the physical layer and higher layers (e.g., based on HARQ-ACK error rate a high HARQ-ACK error rate can enable inter-UE co-ordination).

If inter-UE co-ordination is not configured or not enabled, UE-B follows the Rel-16 resource selection procedure, by determining candidate SL resources within the resource selection window (1502), and randomly selecting resources for current and future SL transmissions within the available candidate resources in the resource selection window (1503).

If inter-UE co-ordination is configured and enabled, the following steps are followed. UE-B can optionally send a trigger or activation message to UE-A to send RSAI (as illustrated in FIG. 9) or UE-A can be sending RSAI without a trigger/activation from UE-B (as illustrated in FIG. 10). UE-B receives resource selection assistance information (i.e. inter-UE co-ordination information) from one or more UE-As (1504). Inter-UE co-ordination information can include preferred and non-preferred resources.

UE-B can check if it has sensing results available (1505), UE-B can check if it has been configured to use its own sensing with the inter-UE co-ordination information (1506). One or more of these checks may not need to be performed. For example, by design, UE-B can always be configured to perform sensing when it is configured to use its sensing results with the inter-UE co-ordination information. Alternatively, if UE-B has sensing results available it can, by design, use the sensing results with the inter-UE co-ordination information with no further configuration.

If UE-B is configured to use its own sensing results and has sensing results available, UE-B determines the candidate SL resources available within a resource selection window (1507). For example, this can be based on the intersection of the preferred resources from each UE-A as well as the exclusion, from the candidate resources within the resource selection window, of the non-preferred resources from each UE-A and taking into account the available resources based on UE-B's own sensing. Other methods for determining the candidate SL resources available within a resource selection window based on the preferred and non-preferred resources from UE-A(s) and UE-B's own sensing results are not precluded. UE-B selects randomly SL resources for the current SL transmission and future SL transmissions (resources for future SL transmissions can be indicated as reserved in the current SL transmission) from within the candidate SL resources available within the resource selection window (1508). The current SL transmission is transmitted on the first-in-time of the randomly selected SL resources.

If UE-B is not configured to use its own sensing results or doesn't have sensing results available, UE-B determines the candidate SL resources available within a resource selection window (1509). For example, this can be based on the intersection of the preferred resources from each UE-A as well as the exclusion, from the candidate resources within the resource selection window, of the non-preferred resources from each UE-A. Other methods for determining the candidate SL resources available within a resource selection window based on the preferred and non-preferred resources from UE-A(s) are not precluded. UE-B selects randomly SL resources for the current SL transmission and future SL transmissions (resources for future SL transmissions can be indicated as reserved in the current SL transmission) from within the candidate SL resources available within the resource selection window (1510). The current SL transmission is transmitted on the first-in-time of the randomly selected SL resources.

If a UE-B receives co-ordination from more than one UE-A, for the selection of a SL resource for SL transmission and/or reservation UE B follows one of the following.

In one example of A1, the UE-B considers only inter-UE co-ordination information (e.g., RSAI) from UE-A(s) that are the intended receivers of UE-B's SL transmission.

In one example of A2, the UE-B considers inter-UE co-ordination information (e.g., RSAI) from all UE-A(s) whether all UE-A(s) are the intended receivers of UE-B's SL transmission or not. Inter-UE co-ordination information (e.g., RSAI) for all UE-A's is considered equally.

In one example of A3, the UE-B considers inter-UE co-ordination information (e.g., RSAI) from all UE-A(s) whether all UE-A(s) are the intended receivers of UE-B's SL transmission or not. In such example, inter-UE co-ordination information (e.g., RSAI) from a UE-A's that are the intended receivers of a UE-B SL transmission are considered with a higher priority than inter-UE co-ordination information (e.g., RSAI) from the UE-A's that are not the intended receivers of a UE-B SL transmission. For example, the UE-A selects a SL resource for SL transmission and/or reservation that is a preferred SL resources (and/or that is not a non-preferred SL resource) based on inter-UE co-ordination information (e.g., RSAI) from UE-A(s) that is the intended receiver of the SL transmission. The UE-A further attempt, when possible, to select a SL resource for SL transmission and/or reservation that is a preferred SL resources (and/or that is not a non-preferred SL resource) based on inter-UE co-ordination information (e.g., RSAI) from UE-A(s) that is not the intended receiver of the SL transmission.

In one example of A1, A2 and A3, a UE-B may further consider resources available based on the UE-B's own sensing (e.g., candidate resources after resource exclusion at the UE-B based on the UE-B' own sensing).

In one example 2.3.1, a UE-A is configured or pre-configured to support one of the three cases of example 2.3. i.e., a UE-A can be configured or pre-configured to support case 1. Alternatively, a UE-A can be configured or pre-configured to support case 2. Alternatively, a UE-A can be configured or pre-configure to support case 3. Wherein the configuration can be by one of: (1) a gNB, by RRC signaling and/or by MAC CE signaling and/or by L1 control (e.g., DCI) signaling; (2) an eNB, by RRC signaling and/or by MAC CE signaling and/or by L1 control (e.g., DCI) signaling; or (3) another SL UE, by RRC signaling and/or by MAC CE signaling and/or by L1 control (e.g., first part/stage SCI and/or second part/stage SCI) signaling. In one example, the SL UE can be an infra-structure, e.g., an RSU). In another example, the SL UE can be a group leader (e.g., a platoon leader). In another example, the SL UE can be a UE-B receiving the RSAI message (inter-UE co-ordination message). In one example, a UE-B can include the type of resources (preferred or non-preferred or a combination of the two) for a UE-A to include in the RSAI message in a trigger (or activation) message a UE-B sends to the UE-A to trigger (or activate) the transmission of the RSAI message.

In one example 2.3.2, it is determined by system specifications which of the three cases, case 1, case 2, or case 3 a UE-A may support.

In one example 2.3.3, a UE-A can support case 1 or case 2, i.e., the UE-A determines whether to transmit preferred or non-preferred SL resources in the Inter-UE co-ordination (e.g., RSAI) message. The decision to transmit preferred or non-preferred resources in the RSAI message, can be, for example, based on the type of resources that require a smaller or more efficient message to transmit.

In one example 2.3.3.1, an indication in the RSAI message (e.g., a flag) can indicate the type of resources whether preferred or non-preferred resources are included in the RSAI message. The indication can be explicit, e.g., a field is included in the message to indicate the type of resources included in RSAI, or the indication can be implicit, e.g., the selected resource (in time, frequency and/or code domains) for conveying the RSAI can indicate the type of resources.

In another example 2.3.3.2, the type of resources is indicated in a separate message from a UE-A to a UE-B.

In one example 2.3.4, a UE-B is configured or pre-configured to support one of the three cases of example 2.3. i.e., a UE-B can be configured or pre-configured to support case 1. Alternatively, a UE-B can be configured or pre-configured to support case 2. Alternatively, a UE-B can be configured or pre-configure to support case 3. Wherein the configuration can be by one of: (1) a gNB, by RRC signaling and/or by MAC CE signaling and/or by L1 control (e.g., DCI) signaling; (2) an eNB, by RRC signaling and/or by MAC CE signaling and/or by L1 control (e.g., DCI) signaling; or (3) another SL UE, by RRC signaling and/or by MAC CE signaling and/or by L1 control (e.g., first part/stage SCI and/or second part/stage SCI) signaling. In one example, the SL UE can be an infra-structure, e.g., an RSU. In another example, the SL UE can be a group leader (e.g., a platoon leader). In another example, the SL UE can be a UE-A transmitting the RSAI message (inter-UE co-ordination message). In one example, the UE-A can include the type of resources (preferred or non-preferred or a combination of the two) for a UE-B to receive in the RSAI message.

In one example 2.3.5, it is determined by system specifications which of the three cases, case 1, case 2, or case 3 a UE-B may support.

In one example 2.3.6, a UE-B is configured or pre-configured to support (or not) the consideration of candidate resource set determined based on the UE-B's sensing in addition to inter-UE co-ordination (e.g., RSAI) message received from a UE-A for selection of SL resources for SL transmission and/or reservation. Wherein the configuration can be by one of: (1) a gNB, by RRC signaling and/or by MAC CE signaling and/or by L1 control (e.g., DCI) signaling; (2) an eNB, by RRC signaling and/or by MAC CE signaling and/or by L1 control (e.g., DCI) signaling; (3) another SL UE, by RRC signaling and/or by MAC CE signaling and/or by L1 control (e.g., first part/stage SCI and/or second part/stage SCI) signaling. In one example, the SL UE can be an infra-structure, e.g., an RSU. In another example, the SL UE can be a group leader (e.g., a platoon leader). In another example, the SL UE can be a UE-A transmitting the RSAI message (inter-UE co-ordination message).

In a further example 2.3.6.1, the use (or not) of the candidate resources based on a UE-B's sensing in addition to inter-UE co-ordination (e.g., RSAI) message can be based on additional criteria such as: power consumption (more sensing consumes more power), HARQ-ACK error rate, congestion level of SL channel (CBR/CR metrics), priority of SL traffic, periodicity of SL traffic (periodic vs aperiodic (whether periodic reservation is enabled for a resource pool), and if periodic the reservation interval).

In one example 2.3.7, a UE-B is configured or pre-configured to support one of examples A1 or A2 or A3. i.e., a UE-B can be configured or pre-configured to support A1. Alternatively, a UE-B can be configured or pre-configured to support A2. Alternatively, a UE-B can be configured or pre-configure to support A3. A UE-B may be further configured the number of UE-A's it may receiver inter-UE co-ordination (e.g., RSAI) message form. A separate configuration may be included for the number of UE-As that are the intended receivers of a UE-B SL transmission, and/or the number of UE-As that are not the intended receivers of a UE-B SL transmission, and/or the number of total number UE-As that are or are not the intended receivers of a UE-B SL transmission. Wherein the configuration can be by one of: (1) a gNB, by RRC signaling and/or by MAC CE signaling and/or by L1 control (e.g., DCI) signaling; (2) an eNB, by RRC signaling and/or by MAC CE signaling and/or by L1 control (e.g., DCI) signaling; (3) another SL UE, by RRC signaling and/or by MAC CE signaling and/or by L1 control (e.g., first part/stage SCI and/or second part/stage SCI) signaling. In one example, the SL UE can be an infra-structure UE, e.g., an RSU. In another example, the SL UE can be a group leader (e.g., a platoon leader). In another example, the SL UE can be a UE-A transmitting the RSAI message (inter-UE co-ordination message).

The number of UE-As a UE-B can receive inter-UE co-ordination (e.g., RSAI) message from can be a UE-capability.

The ability of UE-B to receive inter-UE coordination (e.g., RSAI) message from a UE that is the intended receiver of the UE-B's SL transmission, or from any other UE can be a further UE capability.

In one example 2.4, the preferred resources of the inter-UE co-ordination (e.g., RSAI) message may include preferred resources with different preference levels: (1) a first preferred resources, with highest preference level, a UE-B selects SL resources for SL transmission and/or reservation within this set whenever possible; (2) a second preferred resources (if any), with second preference level, a UE-B selects SL resources for SL transmission and/or reservation including resources in this set if there no SL resources available in the first preferred resources, or if the SL resources available in the first preferred resources are not sufficient (e.g., the available SL resources as a percentage of the total resources within a resource selection window is less than or less than or equal to a threshold); and/or (3) a third preferred resources (if any), with third preference level, a UE-B selects SL resources for SL transmission and/or reservation including resources in this set if there no SL resources available in the first and second preferred resources, or if the SL resources available in the first and second preferred resources are not sufficient (e.g., the available SL resources as a percentage of the total resources within a resource selection window is less than or less than or equal to a threshold). The threshold of the percentage of total resources available in a resource selection window can be specified in the system specification and/or pre-configured and/or configured/updated by RRC/MAC CE/L1 control signaling (from gNB/eNB or another UE).

Figure 16:
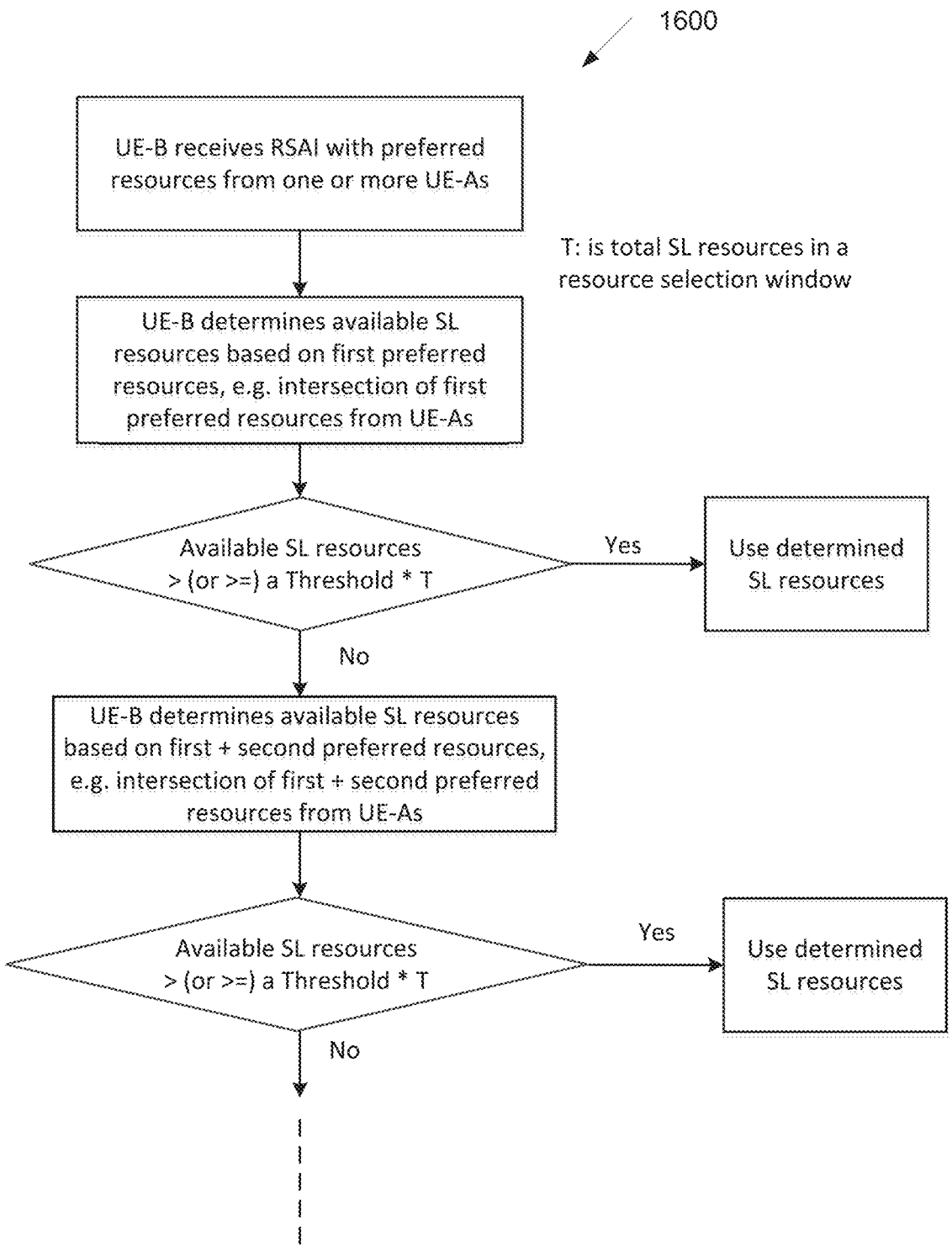
FIG. 16 illustrates an example flowchart of a process for a UE-B receiving inter-UE co-ordination message from more than one UE-A according to embodiments of the present disclosure.

FIG. 16 illustrates an example flowchart of a process 1600 for a UE-B receiving inter-UE co-ordination message from more than one UE-A according to embodiments of the present disclosure. The process 1600 may be performed by UEs (e.g., 111-116 as illustrated in FIG. 1). An embodiment of the process 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

As illustrated, for a UE-B receiving inter-UE co-ordination message from more than one UE-A: (1) in B1, a UE-B uses the intersection of the first preferred resources of UE-As (according to A1, A2 or A3 of example 2.3); (2) in B2, if first preferred resources for B1 are not sufficient (e.g., the preferred resources as a percentage of the total resources within a resource selection window is less than or less than or equal to a threshold), a UE-B uses the intersection of the first plus second preferred resources of UE-As (according to A1, A2 or A3 of example 2.3); and/or (3) in B3, if first plus second preferred resources for B2 are not sufficient (e.g., the preferred resources as a percentage of the total resources within a resource selection window is less than or less than or equal to a threshold), a UE-B uses the intersection of the first plus second plus third preferred resources of UE-As (according to A1, A2 or A3 of example 2.3). The threshold of the percentage of total resources available in a resource selection window can be specified in the system specification and/or pre-configured and/or configured/updated by RRC/MAC CE/L1 control signaling (from gNB/eNB or another UE).

Figure 17:
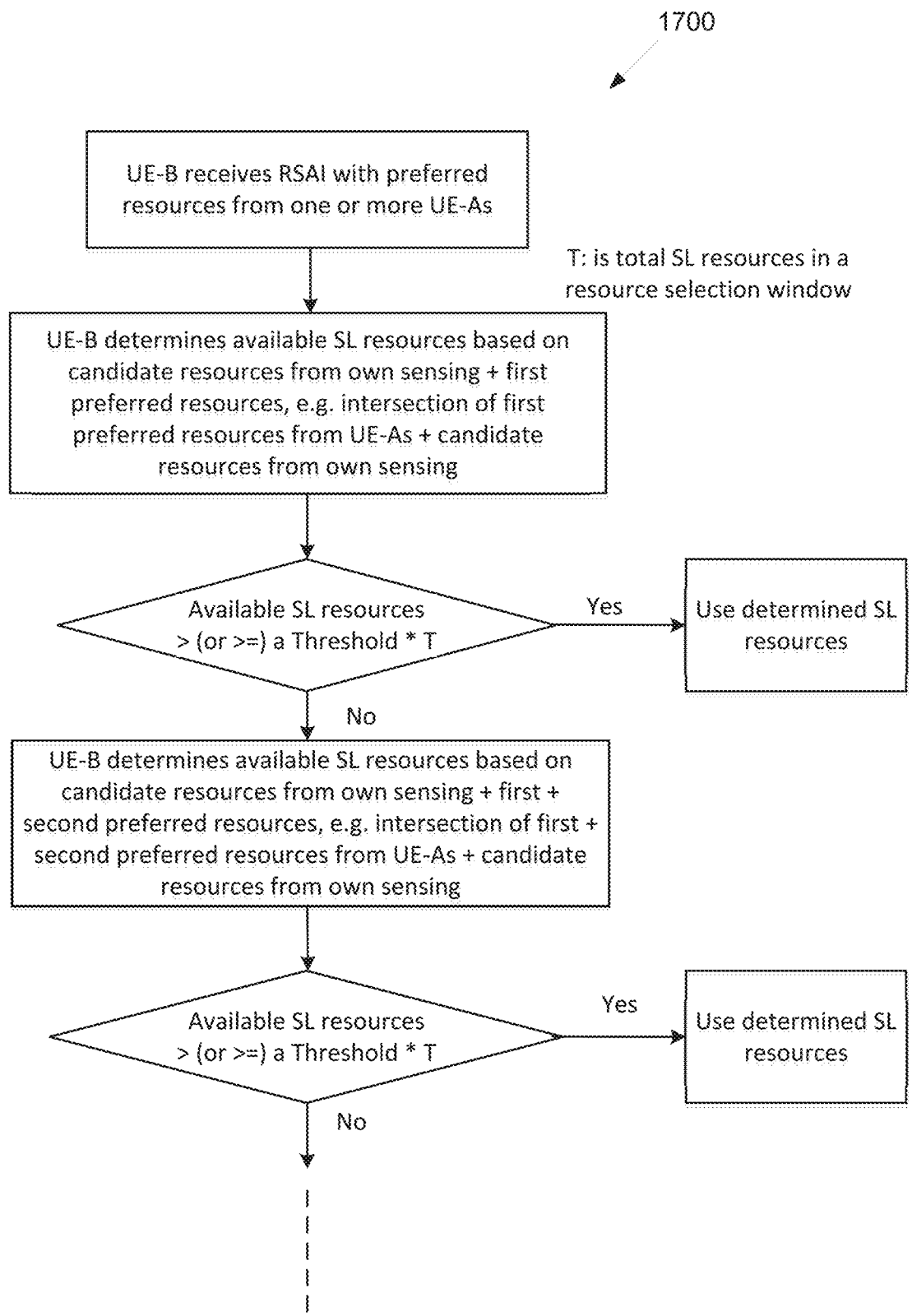
FIG. 17 illustrates an example flowchart of a process for a UE-B receiving inter-UE co-ordination message from one or more UE-As, and using candidate resources based on the UE-B's own sensing according to embodiments of the present disclosure.

FIG. 17 illustrates an example flowchart of a process 1700 for a UE-B receiving inter-UE co-ordination message from one or more UE-As and using candidate resources based on the UE-B's own sensing according to embodiments of the present disclosure. The process 1700 may be performed by UEs (e.g., 111-116 as illustrated in FIG. 1). An embodiment of the process 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

As illustrated, for a UE-B receiving inter-UE co-ordination message from one or more UE-As, and using candidate resources based on the UE-B's own sensing: (1) in C1, a UE-B uses the intersection of the first preferred resources of UE-A(s) and candidate resources based on the UE-B's sensing (according to A1, A2 or A3 of example 2.3); (2) in C2, if first preferred resources and candidate resources for C1 are not sufficient (e.g., the available SL resources as a percentage of the total resources within a resource selection window is less than or less than or equal to a threshold), the UE-B uses the intersection of the first plus second preferred resources of UE-As and candidate resources based on the UE-B's sensing (according to A1, A2 or A3 of example 2.3); and/or (3) in C3, if first plus second preferred resources and candidate resources for C2 are not sufficient (e.g., the available SL resources as a percentage of the total resources within a resource selection window is less than or less than or equal to a threshold), a UE-B uses the intersection of the first plus second plus third preferred resources of UE-As and candidate resources based on the UE-B's sensing (according to A1, A2 or A3 of example 2.3). The threshold of the percentage of total resources available in a resource selection window can be specified in the system specification and/or pre-configured and/or configured/updated by RRC/MAC CE/L1 control signaling (from gNB/eNB or another UE).

An example of first preferred resources from a UE-A to a UE-B can be the resources determined in a candidate set at the UE-A based on UE-A's sensing. First preferred resources can further exclude any resources used for UE-A's SL transmission/reception.

An example of second preferred resources from a UE-A to a UE-B can be the resources excluded in step 5 of the resource exclusion procedure (e.g., as defined in section 8.1.4 of TS 38.214 of the 3GPP standard specifications). These are resources excluded due to the UE-A's SL transmissions during sensing, as a result there is no determined collision in these resources, but collision is possible. In a further example, the resources excluded due to step 5 of the resource exclusion procedure can be considered as third preferred resources.

Another example of second preferred resources from a UE-A to a UE-B can be the resources allocated to UL configured grant transmission. These resources can potentially be used for UL transmissions (there is a risk of collision but not a definitive collision). In a further example, the resources allocated to UL configured grant transmission can be considered as third preferred resources. Second and if applicable third preferred resources can further exclude any resources used for a UE-A's SL transmission/reception.

Preferred resources can also exclude resources used for other UL transmissions such as: (1) PRACH preamble for Type 1 and Type 2 Random access procedure; (2) PUSCH (MsgA PUSCH) for Type 2 Random access procedure; (3) message 3 RACH resources; (4) PUCCH transmissions including UCI for the Uu interface and/or SL HARQ-ACK feedback to network; (5) dynamically scheduled PUSCH transmission; and/or (6) SRS transmissions (periodic, semi-persistent and aperiodic).

The exclusion of resources from the preferred resources can be based on the priority level of the UL transmission. It can be further based on the priority level of the SL transmission for which the inter-UE co-ordination message (e.g., RSAI message) is to be used for. For example, the SL priority of the SL transmission can be provided to a UE-A in the trigger/activation message from a UE-B to the UE-A that triggers/activates the inter-UE co-ordination (e.g., RSAI) message.

Furthermore, exclusion can be for some but not all preferred resources, e.g., based on priority-level. For example, (1) higher priority UL transmissions, and/or UL transmissions that may definitely or near definitely occur are excluded from first, second, third, . . . preferred resources, (2) medium priority UL transmission, and/or UL transmission that are possible, are not excluded from the first preferred resources, but are excluded from the second, third preferred resources, (3) lower priority UL transmission, and/or UL transmission that are less likely, are not excluded from the first or second preferred resources, but are excluded from the third preferred resources.

Alternatively, higher priority UL transmissions, and/or UL transmissions that will definitely or near definitely occur are excluded from first, second, third, . . . preferred resources. Medium priority UL transmission, and/or UL transmission that are possible, are excluded from the first and second preferred resources, but are not excluded from the third preferred resources. Lower priority UL transmission, and/or UL transmission that are less likely, are excluded from the first preferred resources, but are not excluded from the second and third preferred resources.

In a further example, there is only first and second preferred resources and no third preferred resources.

In a further example there is only first preferred resources.

Preferred resources can also exclude resources used for SL LTE transmissions and/or receptions.

The exclusion of resources from the preferred resources can be based on the priority level of the LTE SL transmission/reception. It can be further based on the priority level of the NR SL transmission for which the inter-UE co-ordination message (e.g., RSAI message) is to be used for. For example, the SL priority of the NR SL transmission can be provided to a UE-A in the trigger/activation message from a UE-B to the UE-A that triggers/activates the inter-UE co-ordination (e.g., RSAI) message.

Furthermore, exclusion can be for some but not all preferred resources, e.g., based on priority-level. For example, (1) higher priority LTE SL transmissions/receptions, and/or LTE SL transmissions/receptions that may definitely or near definitely occur are excluded from first, second, third, . . . preferred resources; (2) medium priority LTE SL transmissions/receptions, and/or LTE SL transmissions/receptions that are possible, are not excluded from the first preferred resources, but are excluded from the second, third preferred resources; (3) Lower priority LTE SL transmissions/reception, and/or LTE SL transmissions/receptions that are less likely, are not excluded from the first or second preferred resources, but are excluded from the third preferred resources.

Alternatively, higher priority LTE SL transmissions/receptions, and/or LTE SL transmissions/receptions that will definitely or near definitely occur are excluded from first, second, third, . . . preferred resources. Medium priority LTE SL transmissions/receptions, and/or LTE SL transmissions/receptions that are possible, are excluded from the first and second preferred resources, but are not excluded from the third preferred resources. Lower priority LTE SL transmissions/receptions, and/or LTE SL transmissions/receptions that are less likely, are excluded from the first preferred resources, but are not excluded from the second and third preferred resources.

Figure 18:
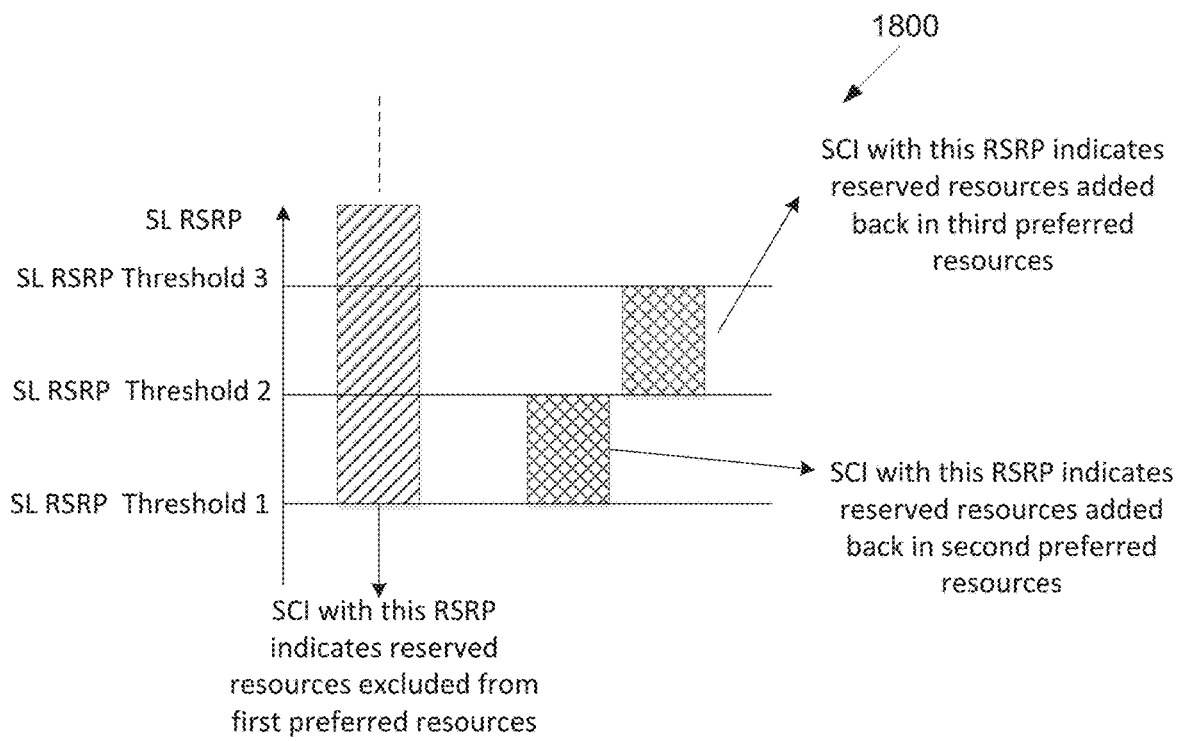
FIG. 18 illustrates an example diagram for a preference level of preferred resources according to embodiments of the present disclosure.

FIG. 18 illustrates an example diagram 1800 for a preference level of preferred resources according to embodiments of the present disclosure. An embodiment of the diagram 1800 shown in FIG. 18 is for illustration only.

As illustrated, the preference level of preferred resources can be determined based on the SL RSRP (PSCCH DMRS RSRP or PSSCH DMRS RSRP) of the decoded SCI during sensing. First preferred resources (if any) exclude SL resources within a resource selection window that are reserved by a decoded SCI in the sensing window with RSRP more than (or more than or equal to) RSRP_Threshold1. Second preferred resources (if any) add SL resources within a resource selection window that are reserved by a decoded SCI in the sensing window with RSRP between RSRP_Threshold1 and RSRP_Threshold2. Third preferred resources (if any) add SL resources within a resource selection window that are reserved by a decoded SCI in the sensing window with RSRP between RSRP_Threshold2 and RSRP_Threshold3. RSRP_Threshold1<RSRP_Threshold2<RSRP_Threshold3, . . . . Thresholds are pre-configured and/or configured/updated by RRC/MAC CE/L1 control signaling (from gNB/eNB or another UE).

Figure 19:
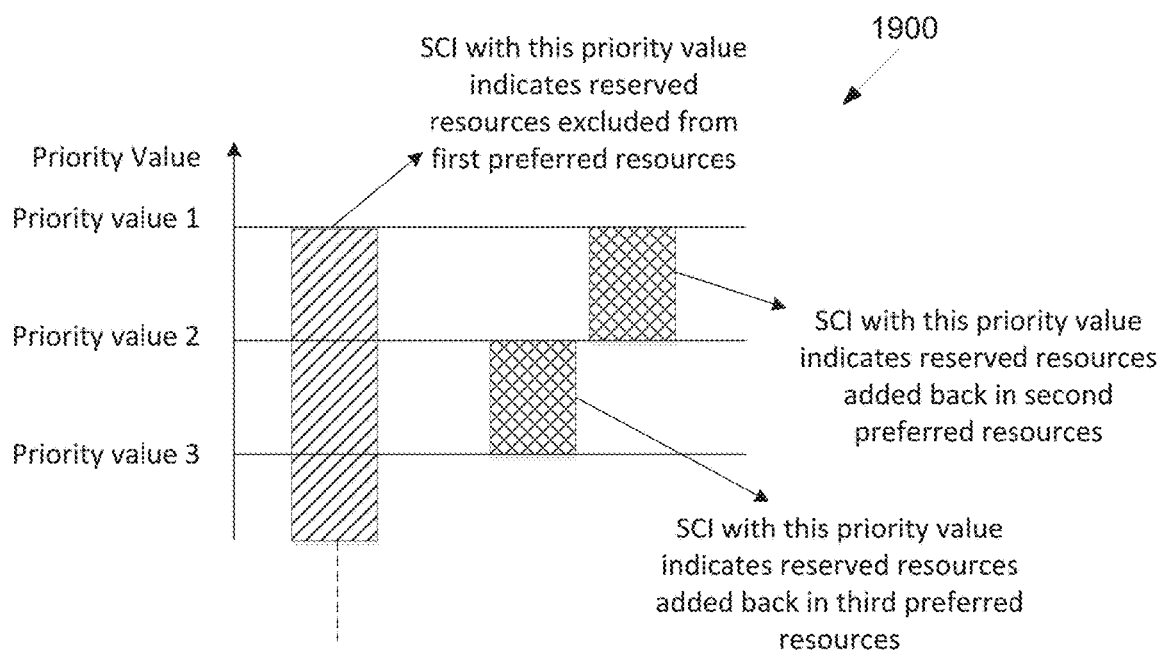
FIG. 19 illustrates an example diagram for a preference level of preferred resources according to embodiments of the present disclosure.

FIG. 19 illustrates an example diagram 1900 for a preference level of preferred resources according to embodiments of the present disclosure. An embodiment of the diagram 1900 shown in FIG. 19 is for illustration only.

As illustrated, the preference level of preferred resources can be determined based on the priority value of the decoded SCI during sensing. A higher priority value indicates a lower priority. The priority value is provided by the priority field of the decoded SCI. First preferred resources (if any) exclude SL resources within a resource selection window that are reserved by a decoded SCI in the sensing window with priority value less than (or less than or equal to) priority value 1. Second preferred resources (if any) add SL resources within a resource selection window that are reserved by a decoded SCI in the sensing window with priority value between priority value 1 and priority value 2. Third preferred resources (if any) add SL resources within a resource selection window that are reserved by a decoded SCI in the sensing window with priority value between priority value 2 and priority value 3. Here, priority value 1>priority value 2>priority value 3, . . . . The priority values are pre-configured and/or configured/updated by RRC/MAC CE/L1 control signaling (from gNB/eNB or another UE). In one example, priority value 1 can be specified in the system specifications.

In another example, the preference level of preferred resources can be determined based on a combination of SL RSRP (PSCCH DMRS RSRP or PSSCH DMRS RSRP) and the priority value of the decoded SCI during sensing. A higher priority value indicates a lower priority. The priority value is provided by the priority field of the decoded SCI. For example, the SL thresholds for determining preference level is determined based on the priority level. SL thresholds for each priority level are pre-configured and/or configured/updated by RRC/MAC CE/L1 control signaling (from gNB/eNB or another UE).

In a further example, there is only first and second preferred resources and no third preferred resources.

In a further example there is only first preferred resources.

In another example 2.5, the non-preferred resources of the inter-UE co-ordination (e.g., RSAI) message may include non-preferred resources with different preference levels: (1) a first non-preferred resources, with highest preference level to exclude; (2) a second non-preferred resources (if any), with second preference level to excluded; (3) a third non-preferred resources (if any), with third preference level to excluded. Where the non-preferred resources are sequentially ordered with the preference level as required.

A UE-B selects SL resources for SL transmission and/or reservation excluding all non-preferred resources, if there are no such resources to select from or if the SL resources available for SL resource selection are not sufficient (e.g., the available SL resources as a percentage of the total resources within a resource selection window is less than or less than or equal to a threshold), UE-B doesn't exclude some of the non-preferred resources from the set of resources available for resource selection starting with those that are least non-preferred (e.g., non-preferred resources with third preference level), then non-preferred resources with second preference level, until there are sufficient SL resources for SL resource selection (e.g., the available SL resources as a percentage of the total resources within a resource selection window is more than or more than or equal to a threshold).

Figure 20:
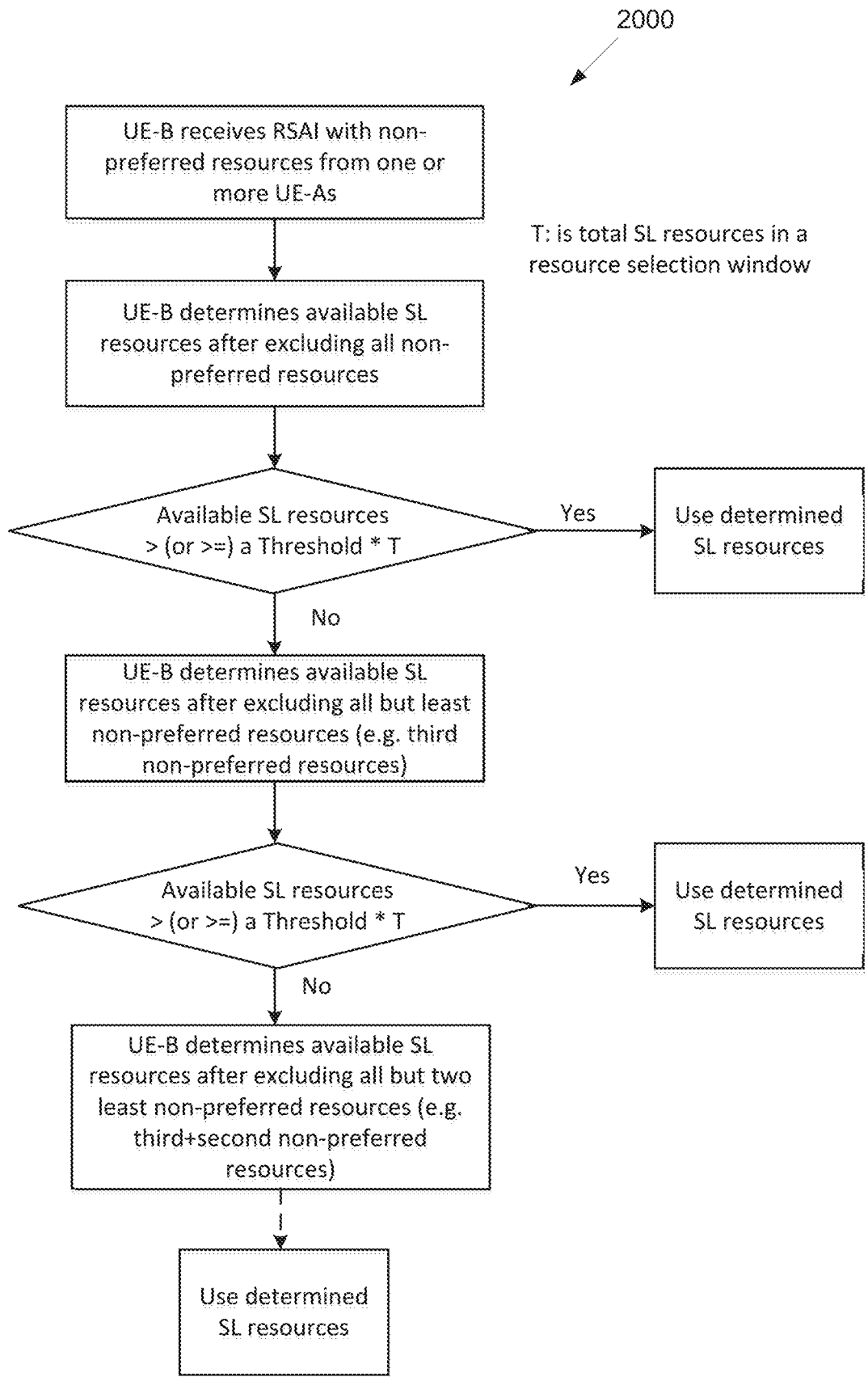
FIG. 20 illustrates an example flowchart of a process for a UE-B receiving inter-UE co-ordination message from more than one UE-A according to embodiments of the present disclosure.

FIG. 20 illustrates an example flowchart of a process 2000 for a UE-B receiving inter-UE co-ordination message from more than one UE-A according to embodiments of the present disclosure. The process 2000 may be performed by UEs (e.g., 111-116 as illustrated in FIG. 1). An embodiment of the process 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

As illustrated in FIG. 20, a UE-B receives inter-UE co-ordination message from more than one UE-A, first excludes all non-preferred resources from all UE-As (according to A1, A2 or A3 of example 2.3). If there are no such resources to select from or if the SL resources available for SL resource selection are not sufficient (e.g., the available SL resources as a percentage of the total resources within a resource selection window is less than or less than or equal to a threshold), UE-B doesn't exclude some of the non-preferred resources from the set of resources available for resource selection starting with those that are least non-preferred for UE-As (according to A1, A2 or A3 of example 2.3) (e.g. non-preferred resources with third preference level), then non-preferred resources with second preference level, until there are sufficient SL resources for SL resource selection (e.g., the available SL resources as a percentage of the total resources within a resource selection window is more than or more than or equal to a threshold).

Figure 21:
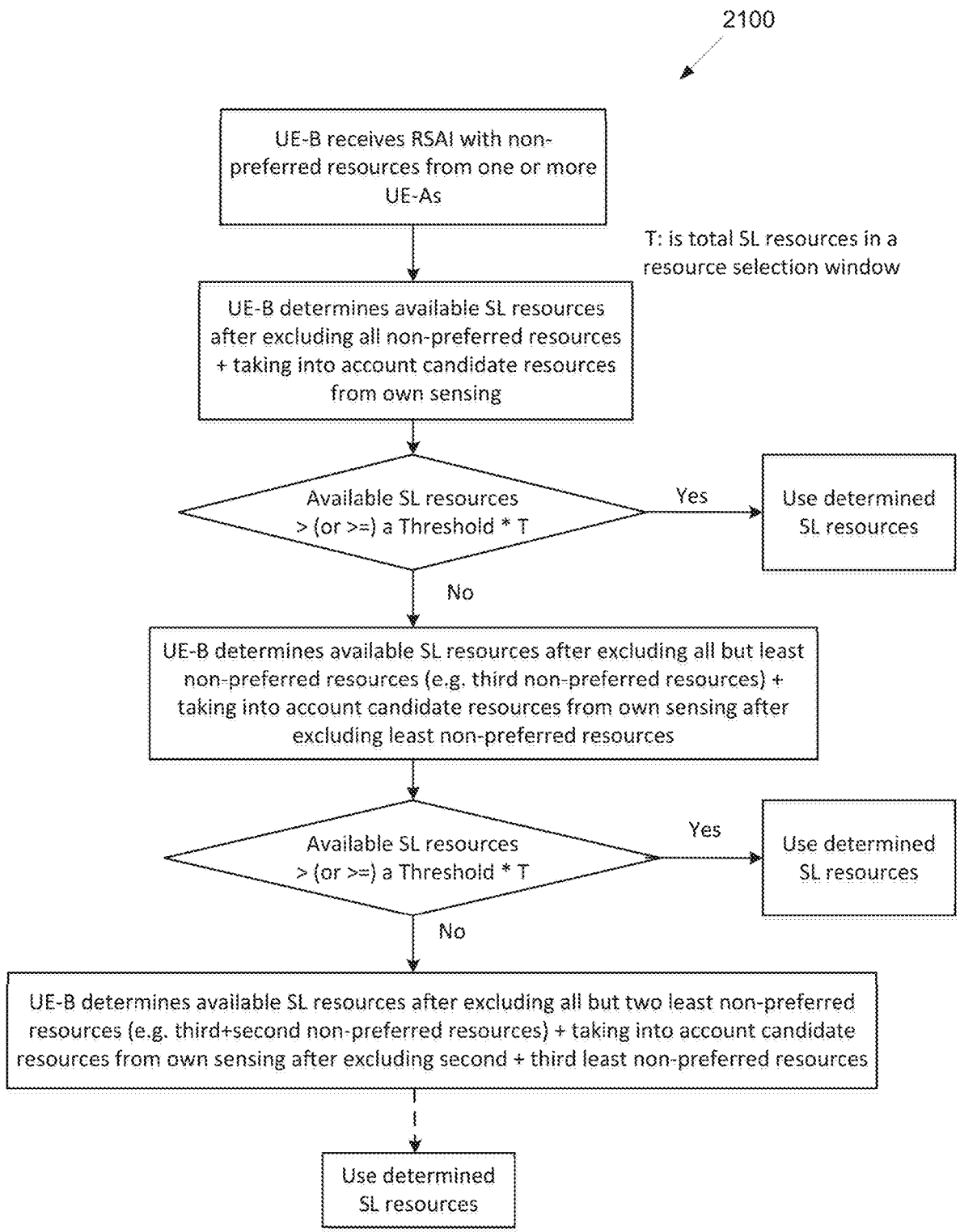
FIG. 21 illustrates an example flowchart of a process for a UE-B receiving inter-UE co-ordination message from more than one UE-A according to embodiments of the present disclosure.

FIG. 21 illustrates an example flowchart of a process 2100 for a UE-B receiving inter-UE co-ordination message from more than one UE-A according to embodiments of the present disclosure. The process 2100 may be performed by UEs (e.g., 111-116 as illustrated in FIG. 1). An embodiment of the process 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

As illustrated in FIG. 21, a UE-B receiving inter-UE co-ordination message from one or more UE-A and using candidate resources based on its own sensing. UE-B starts with the candidate set based on its own sensing and excludes all non-preferred resources from all UE-As (according to A1, A2 or A3 of example 2.3). If there are no such resources to select from or if the SL resources available for SL resource selection are not sufficient (e.g., the available SL resources as a percentage of the total resources within a resource selection window is less than or less than or equal to a threshold), UE-B doesn't exclude some of the non-preferred resources from the set of resources available for resource selection starting with those that are least non-preferred for UE-As (according to A1, A2 or A3 of example 2.3) (e.g., non-preferred resources with third preference level), then non-preferred resources with second preference level, until there are sufficient SL resources for SL resource selection (e.g., the available SL resources as a percentage of the total resources within a resource selection window is more than or more than or equal to a threshold).

In a further example, the UE-B allows some of the resources excluded from the candidate resources due to the UE-B's own resource exclusion (e.g., due to the UE-B's own sensing—step 5 of the resource exclusion procedure as defined in 3GPP standard specification) back to the candidate set. The inclusion of such resources in the candidate set used for resource selection at the UE-B can be based on the preference level of the non-preferred resources from UE-A(s) not excluded from the candidate set. The threshold of the percentage of total resources available in a resource selection window can be specified in the system specification and/or pre-configured and/or configured/updated by RRC/MAC CE/L1 control signaling (from gNB/eNB or another UE).

An example of first non-preferred resources from a UE-A to a UE-B can be the resources determined as reserved by other UEs during sensing in the UE-A. First non-preferred resources can further include any resources used for the UE-A's SL transmission/reception.

An example of second non-preferred resources from a UE-A to a UE-B can be the resources excluded in step 5 of the resource exclusion procedure (e.g., as defined in clause 8.1.4 of TS 38.214 of the 3GPP standard specification). These are resources excluded due to the UE-A's SL transmissions during sensing, as a result there is no determined collision in these resources, but collision is possible. In a further example, the resources excluded due to step 5 of the resource exclusion procedure can be considered as third non-preferred resources.

Another example of second non-preferred resources from a UE-A to a UE-B can be the resources allocated to UL configured grant transmission. These resources can potentially be used for UL transmissions (there is a risk of collision but not a definitive collision). In a further example, the resources allocated to UL configured grant transmission can be considered as third non-preferred resources.

Non-preferred resources can also include resources used for other UL transmissions such as: (1) PRACH preamble for Type 1 and Type 2 random access procedure; (2) PUSCH (MsgA PUSCH) for Type 2 Random access procedure; (3) message 3 RACH resources; (4) PUCCH transmissions including UCI for the Uu interface and/or SL HARQ-ACK feedback to network; (5) dynamically scheduled PUSCH transmission; and/or (6) SRS transmissions (periodic, semi-persistent and aperiodic).

The inclusion of resources in the non-preferred resources can be based on the priority level of the UL transmission. It can be further based on the priority level of the SL transmission for which the inter-UE co-ordination message (e.g., RSAI message) is to be used for. For example, the SL priority of the SL transmission can be provided to a UE-A in the trigger/activation message from a UE-B to the UE-A that triggers/activates the inter-UE co-ordination (e.g., RSAI) message.

Furthermore, inclusion can be for some but not all non-preferred resources, e.g., based on priority-level. For example, (1) higher priority UL transmissions, and/or UL transmissions that may definitely or near definitely occur are included in the first non-preferred resources, (2) medium priority UL transmission, and/or UL transmission that are possible are included in the second non-preferred resources, and (3) lower priority UL transmission, and/or UL transmission that are less likely are included in the third non-preferred resources. Where the priority is sequentially ordered for the UL transmission as required.

Figure 22:
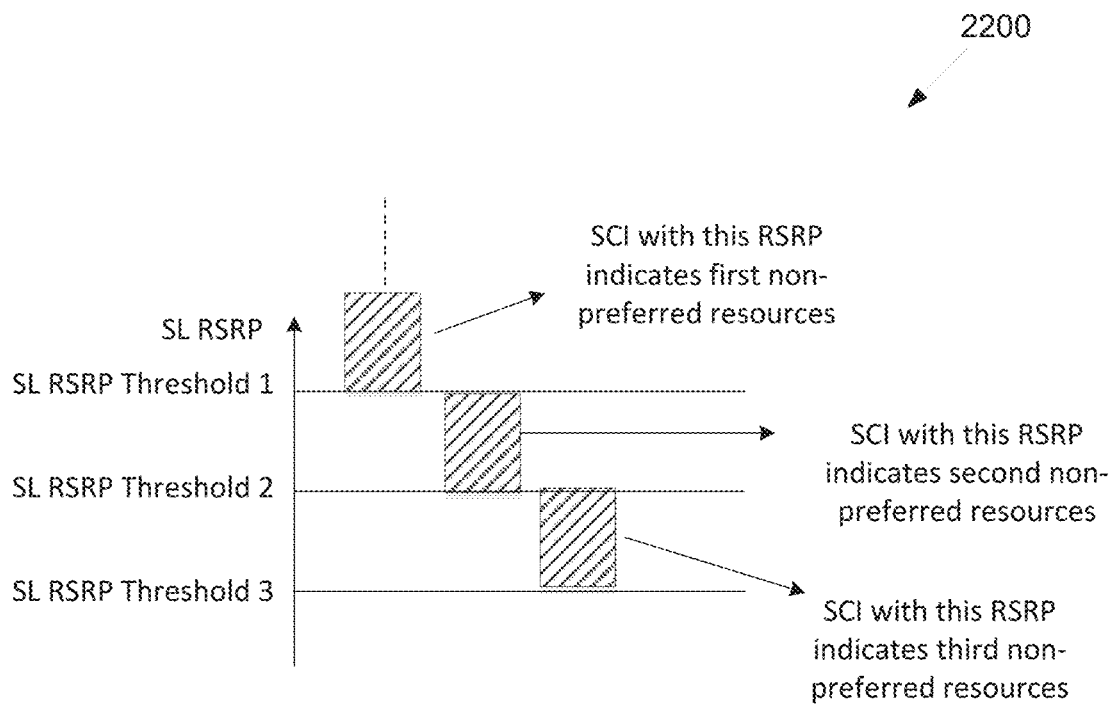
FIG. 22 illustrates an example diagram for a preference level of preferred resources according to embodiments of the present disclosure.

FIG. 22 illustrates an example diagram 2200 for a preference level of preferred resources according to embodiments of the present disclosure. An embodiment of the diagram 2200 shown in FIG. 22 is for illustration only.

As illustrated in FIG. 22, the preference level of non-preferred resources can be determined based on the SL RSRP (PSCCH DMRS RSRP or PSSCH DMRS RSRP) of the decoded SCI during sensing. First non-preferred resources (if any) include SL resources within a resource selection window that are reserved by a decoded SCI in the sensing window with RSRP more than (or more than or equal to) RSRP_Threshold1. Second non-preferred resources (if any) include SL resources within a resource selection window that are reserved by a decoded SCI in the sensing window with RSRP between RSRP_Threshold1 and RSRP_Threshold2. Third non-preferred resources (if any) include SL resources within a resource selection window that are reserved by a decoded SCI in the sensing window with RSRP between RSRP_Threshold2 and RSRP_Threshold3. Here, RSRP_Threshold1>RSRP_Threshold2>RSRP_Threshold3. The thresholds are pre-configured and/or configured/updated by RRC/MAC CE/L1 control signaling (from gNB/eNB or another UE).

Figure 23:
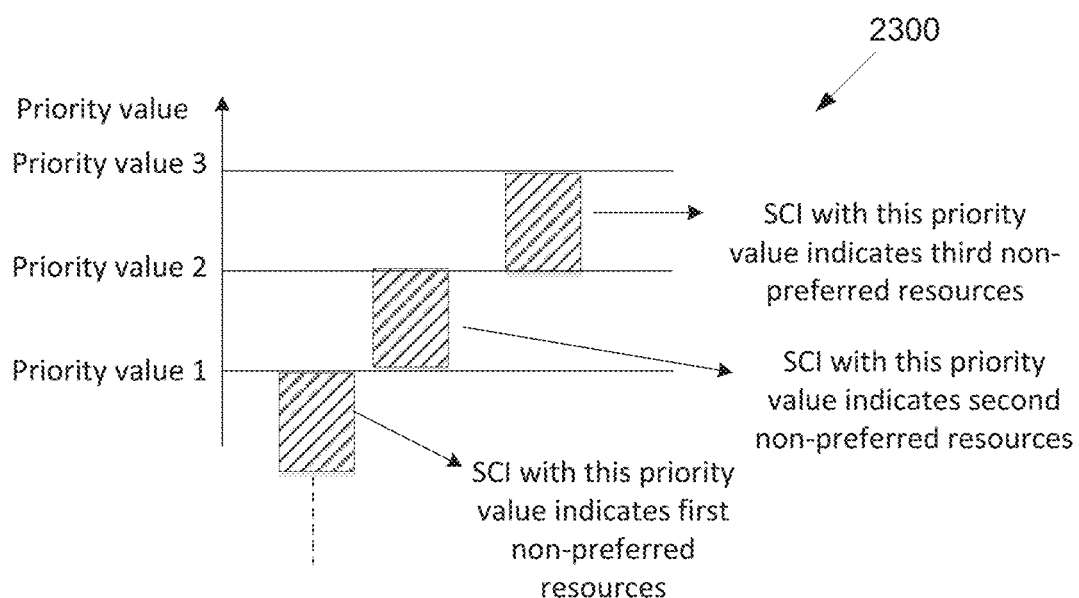
FIG. 23 illustrates an example diagram for a preference level of preferred resources according to embodiments of the present disclosure.

FIG. 23 illustrates an example diagram 2300 for a preference level of preferred resources according to embodiments of the present disclosure. An embodiment of the diagram 2300 shown in FIG. 23 is for illustration only.

As illustrated in FIG. 23, the preference level of non-preferred resources can be determined based on the priority value of the decoded SCI during sensing. A higher priority value indicates a lower priority. The priority value is provided by the priority field of the decoded SCI. First non-preferred resources (if any) include SL resources within a resource selection window that are reserved by a decoded SCI in the sensing window with priority value less than (or less than or equal to) priority value 1. Second non-preferred resources (if any) include SL resources within a resource selection window that are reserved by a decoded SCI in the sensing window with priority value between priority value 1 and priority value 2. Third non-preferred resources (if any) include SL resources within a resource selection window that are reserved by a decoded SCI in the sensing window with priority value between priority value 2 and priority value 3. Here, priority value 1<priority value 2<priority value 3. The priority values are pre-configured and/or configured/updated by RRC/MAC CE/L1 control signaling (from gNB/eNB or another UE). In one example, priority value 1 can be specified in the system specifications.

In another example, the preference level of non-preferred resources can be determined based on a combination of SL RSRP (PSCCH DMRS RSRP or PSSCH DMRS RSRP) and the priority value of the decoded SCI during sensing. A higher priority value indicates a lower priority. The priority value is provided by the priority field of the decoded SCI. For example, the SL thresholds for determining preference level is determined based on the priority level. Wherein, SL thresholds for each priority level are pre-configured and/or configured/updated by RRC/MAC CE/L1 control signaling (from gNB/eNB or another UE).

In a further example, there is only first and second non-preferred resources and no third non-preferred resources.

In a further example there is only first non-preferred resources.

Non-preferred resources can also include resources used for SL LTE transmissions and/or receptions.

The inclusion in non-preferred resources can be based on the priority level of the LTE SL transmission/reception. It can be further based on the priority level of the NR SL transmission for which the inter-UE co-ordination message (e.g., RSAI message) is to be used for. For example, the SL priority of the NR SL transmission can be provided to a UE-A in the trigger/activation message from a UE-B to the UE-A that triggers/activates the inter-UE co-ordination (e.g., RSAI) message.

Furthermore, inclusion can be for some but not all non-preferred resources, e.g., based on priority-level. For example, (1) higher priority LTE SL transmissions/receptions, and/or LTE SL transmissions/receptions that may definitely or near definitely occur are included in the first non-preferred resources, (2) medium priority LTE SL transmissions/receptions, and/or LTE SL transmissions/receptions that are possible are included in the second non-preferred resources, and (3) lower priority LTE SL transmissions/receptions, and/or LTE SL transmissions/receptions that are less likely are included in the third non-preferred resources. Where, the priority is sequentially ordered for the LTE SL transmissions/receptions as required.

In a further example, there is only first and second non-preferred resources and no third non-preferred resources.

In a further example there is only first non-preferred resources.

In another example 2.6, inter-UE co-ordination (e.g., RSAI) message includes preferred and non-preferred resources.

The preferred resources (example 2.4) of the inter-UE co-ordination (e.g., RSAI) message may include preferred resources with different preference levels: (1) a first preferred resources, with highest preference level; (2) a second preferred resources (if any), with second highest preference level; and (3) A third preferred resources (if any), with third highest preference level. Where, the preferred resources are sequentially ordered with preference level as required.

The non-preferred resources (example 2.5) of the inter-UE co-ordination (e.g., RSAI) message may include non-preferred resources with different preference levels: (1) a first non-preferred resources, with highest preference level to exclude; (2) a second non-preferred resources (if any), with second highest preference level to excluded; and (3) a third non-preferred resources (if any), with third highest preference level to excluded. Where, the non-preferred resources are sequentially ordered with preference level as required.

A UE-B selects resources for SL transmission and/or reservation in the first preferred set of resources and excluding all non-preferred resources based on the UE-B's own sensing as well as that of UE-As (according to A1, A2 or A3 of example 2.3).

If there are no such resources to select from or if the SL resources available for SL resource selection are not sufficient (e.g., the available SL resources as a percentage of the total resources within a resource selection window is less than or less than or equal to a threshold), UE-B: (1) includes additional preferred resources with higher preference level (second then third . . . ) and/or (2) does not exclude some of the non-preferred resources from the set of resources available for resource selection starting with those that are least non-preferred for UE-As (according to A1, A2 or A3 of example 2.3) e.g., non-preferred resources with third preference level, then non-preferred resources with second preference level, until there are sufficient SL resources for SL resource selection (e.g., the available SL resources as a percentage of the total resources within a resource selection window is more than or more than or equal to a threshold).

The order of including additional preferred resources or not excluding some non-preferred resources can be specified in system specifications and/or pre-configured and/or configured by higher layers. For example, if there are not enough resources in the UE-B for SL resource selection after including the first preferred resource and excluding and non-preferred resources, the UE-B can at least one of: (1) include the second preferred resources from UE-As; (2) exclude the least favored non-preferred resources; or (3) include some of the resources excluded due to the UE-B's own sensing.

The order of these steps or doing more than one or all at the same time, can be specified in system specifications and/or pre-configured and/or configured by higher layers. The threshold of the percentage of total resources available in a resource selection window can be specified in the system specification and/or pre-configured and/or configured/updated by RRC/MAC CE/L1 control signaling (from gNB/eNB or another UE).

In one example 2.6.1, a SL resource according to the inter-UE co-ordination (RSAI) message, can be one of: (1) a preferred SL resource for SL resource selection at a UE-B; (2) a non-preferred SL resource not to be used for SL resource selection at a UE-B; or (3) neither preferred nor non-preferred SL resource (e.g., undetermined SL resource). This resource can be used for SL resource selection if there not sufficient preferred SL resources for SL resource selection (e.g., the preferred SL resources as a percentage of the total resources within a resource selection window is less than or less than or equal to a threshold).

The inter-UE co-ordination (e.g., RSAI) message can indicate at least two resource sets of: (1) a preferred SL resource for SL resource selection at a UE-B; (2) a non-preferred SL resource not to be used for SL resource selection at a UE-B; or (3) neither preferred nor non-preferred SL resource. The third set of resources, if not indicated, are the remaining resources in a selection window. The threshold of the percentage of total resources available in a resource selection window can be specified in the system specification and/or pre-configured and/or configured/updated by RRC/MAC CE/L1 control signaling (from gNB/eNB or another UE).

Figure 24:
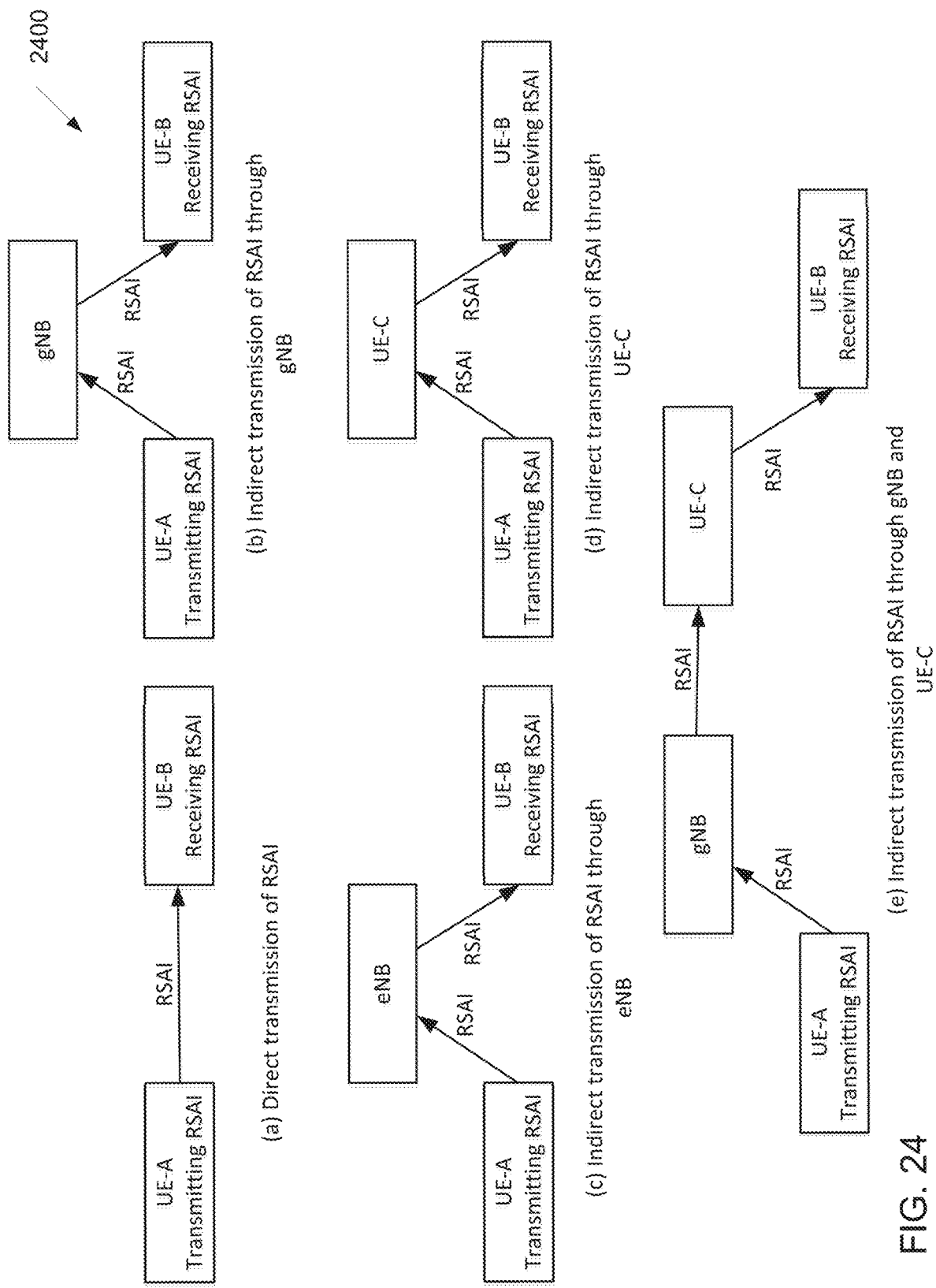
FIG. 24 illustrates an example resource selection assistance information (RSAI) transmission among UEs according to embodiments of the present disclosure.

FIG. 24 illustrates an example RSAI transmission among UEs 2400 according to embodiments of the present disclosure. The RSAI transmission among UEs 2400 may be performed by UEs (e.g., 111-116 as illustrated in FIG. 1). An embodiment of the RSAI transmission among UEs 2400 shown in FIG. 13 is for illustration only.

In one embodiment, a signaling of RSAI information is provided.

The RSAI from a UE transmitting RSAI, also referred to as a controlling UE or UE-A, to one or multiple UEs receiving RSAI, also referred to controlled UE(s) or UE-B(s), can be transmitted according to the following.

In one example 3.1, the RSAI is transmitted directly from a UE-A to a UE-B using the SL (PC5) interface (as illustrated in (a) of FIG. 24). The RSAI can be transmitted using RRC signaling and/or MAC-CE signaling and/or L1 control signaling. The RSAI can be transmitted as a broadcast message and/or groupcast message and/or unicast message as described in example 1.11.

In another example 3.2, the RSAI is transmitted via one or more intermediates nodes from a UE-A to a UE-B using the SL (PC5) interface and/or the Uu interface. This is illustrated in (b), (c), (d) and (e) of FIG. 24. The RSAI can be transmitted using RRC signaling and/or MAC-CE signaling and/or L1 control signaling. The intermediate nodes can be a gNB and/or an eNB and/or another sidelink UE. The RSAI can be transmitted as a broadcast message and/or groupcast message and/or unicast message as described in example 1.11. As an example, the UE-A can transmit the RSAI to a gNB on the uplink Uu interface using a unicast link. The gNB can then broadcast the RSAI to other UEs (i.e., UE-Bs) on the downlink Uu interface using a broadcast or groupcast link.

In the previous examples and embodiments, a single-slot resource can be replaced by a multi-slot resource, a same sidelink transmission is repeated across multiple slots, or one sidelink transmission is transmitted across resources in multiple slots. For example, transmission across the multiple slots can be on the same beam, or in a different beam for each slot. The number of slots in a multi-slot resource can be specified by system specifications and/or configured/updated by higher layer RRC signaling and/or MAC CE signaling and/or L1 control signaling.

In the previous examples and embodiments, a single-slot resource can be replaced by a sub-slot resource, a sidelink transmission is transmitted in a sub-slot. A sub-slot can include one or more OFDMA symbols. The size of the sub-slot (e.g., number of symbols) can be specified by system specifications and/or configured/updated by higher layer RRC signaling and/or MAC CE signaling and/or L1 control signaling.

In the previous examples and embodiments, a single-slot resource can be replaced by a multi-sub-slot resource, a same sidelink transmission is repeated across multiple sub-slots, or one sidelink transmission is transmitted across resources in multiple sub-slots. A sub-slot can include one or more OFDMA symbols. For example, transmission across the multiple sub-slots can be on the same beam, or in a different beam for each sub-slot. The number of sub-slots in a multi-sub-slot resource can be specified by system specifications and/or configured/updated by higher layer RRC signaling and/or MAC CE signaling and/or L1 control signaling. The size of the sub-slot (e.g., number of symbols) can be specified by system specifications and/or configured/updated by higher layer RRC signaling and/or MAC CE signaling and/or L1 control signaling. The sub-slots can be in a same slot or can span multiple slots.

In the present disclosure, a configuration of inter UE co-ordination including the configuration of transmission and reception of resource selection assistance information is provided. In the present disclosure, content of resource selection assistance information is provided.

In the present disclosure, embodiments/examples are directed to the NR standard in 3GPP standard specification.

SL is one of the promising features of NR, targeting verticals such the automotive industry, public safety and other commercial application. Sidelink has been first introduced to NR in release 16, with emphasis on V2X and public safety where the requirements are met. To expand sidelink support to other types of UEs such VRUs, pedestrian UEs (PUEs) and other types of handheld devices, reducing power consumption and reducing latency and improving reliability is of paramount importance.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a processor configured to identify configuration information to enable inter-UE co-ordination for a sidelink (SL) resource pool; and
a transceiver operably coupled to the processor, the transceiver configured to:
transmit, to a target UE, a signal to trigger transmission of inter-UE co-ordination information, wherein the inter-UE co-ordination information is based on sensing at the target UE, and
receive the inter-UE co-ordination information from the target UE,
wherein the inter-UE co-ordination information indicates a plurality of resources including at least one of preferred resources and non-preferred resources,
wherein the preferred resources are resources available for SL transmission and the non-preferred resources are resources not available for SL transmission,
wherein the processor is further configured to:
determine a set of candidate SL resources based on the inter-UE co-ordination information, and
randomly select a SL resource within the determined set, and
wherein the transceiver is further configured to transmit a SL channel on the SL resource.

2. The UE of claim 1, wherein:
the signal to trigger the transmission of inter-UE co-ordination information is included in SL control information (SCI) and a medium access control—control element (MAC-CE), and
the signal to trigger the transmission of inter-UE co-ordination information indicates a priority of the SL channel transmission.

3. The UE of claim 1, wherein the trigger for the transmission of the inter-UE co-ordination information indicates a priority.

4. The UE of claim 1, wherein the inter-UE co-ordination information indicates one or more resources reserved by decoded SL control information (SCI) in a sensing window.

5. The UE of claim 1, wherein:
the processor is further configured to perform sensing, and
the set of candidate SL resources is an intersection of the preferred resources and the sensing.

6. A target user equipment (UE), comprising:
a processor configured to identify configuration information to enable inter-UE co-ordination for a sidelink (SL) resource pool; and
a transceiver operably coupled to the processor, the transceiver configured to receive, from another UE, a signal to trigger transmission of inter-UE co-ordination information, wherein the inter-UE co-ordination information is based on sensing at the target UE,
wherein the processor is further configured to determine, based on the configuration information and the signal to trigger the transmission of inter-UE co-ordination information, the inter-UE co-ordination information,
wherein the inter-UE co-ordination information indicates a plurality of resources including at least one of preferred resources and non-preferred resources,
wherein the preferred resources are resources available for SL transmission and the non-preferred resources are resources not available for SL transmission, and
wherein the transceiver is further configured to:
transmit the inter-UE co-ordination information, and
receive a SL channel on a SL resource in a set of candidate SL resources that are based on the inter-UE co-ordination information.

7. The target UE of claim 6, wherein:
the signal to trigger the transmission of inter-UE co-ordination information is included in SL control information (SCI) and a medium access control—control element (MAC-CE), and the signal to trigger the transmission of inter-UE co-ordination information indicates a priority of the SL channel reception.

8. The target UE of claim 6, wherein the trigger for the transmission of the inter-UE co-ordination information indicates a priority.

9. The target UE of claim 6, wherein the inter-UE co-ordination information indicates one or more resources reserved by decoded SL control information (SCI) in a sensing window.

10. The target UE of claim 6, wherein the set of candidate SL resources is an intersection of the preferred resources and sensing at the other UE.

11. A method of operating a user equipment (UE), the method comprising:
  identifying configuration information to enable inter-UE co-ordination for a sidelink (SL) resource pool;
  transmitting, to a target UE, a signal to trigger transmission of inter-UE co-ordination information, wherein the inter-UE co-ordination information is based on sensing at the target UE;
  receiving the inter-UE co-ordination information from the target UE, wherein:
    the inter-UE co-ordination information indicates a plurality of resources including at least one of preferred resources and non-preferred resources, and
    the preferred resources are resources available for SL transmission and the non-preferred resources are resources not available for SL transmission;
  determining a set of candidate SL resources based on the inter-UE co-ordination information;
  randomly selecting a SL resource within the determined set; and
  transmitting a SL channel on the SL resource.

12. The method of claim 11, wherein:
  the signal to trigger the transmission of inter-UE co-ordination information is included in SL control information (SCI) and a medium access control—control element (MAC-CE), and
  the signal to trigger the transmission of inter-UE co-ordination information indicates a priority of the SL channel transmission.

13. The method of claim 11, wherein the trigger for the transmission of the inter-UE co-ordination information indicates a priority.

14. The method of claim 11, wherein the inter-UE co-ordination information indicates one or more resources reserved by decoded SL control information (SCI) in a sensing window.

15. The method of claim 11, further comprising:
  performing sensing,
  wherein the set of candidate SL resources is an intersection of the preferred resources and the sensing.

* * * * *